US012054149B2

(12) United States Patent
George et al.

(10) Patent No.: US 12,054,149 B2
(45) Date of Patent: Aug. 6, 2024

(54) VISION-BASED FOLLOW THE LEADER LATERAL CONTROLLER

(71) Applicant: Stack AV Co., Mount Pleasant, PA (US)

(72) Inventors: Michael David George, Pittsburgh, PA (US); Tekin Alp Meriçli, Pittsburgh, PA (US); Cetin Alp Meriçli, Pittsburgh, PA (US); Venkataramanan David Rajagopalan, Sewickley, PA (US); Alonzo James Kelly, Edgeworth, PA (US)

(73) Assignee: Stack AV Co., Mount Pleasant, PA (US)

( * ) Notice: Subject to any disclaimer, the term of this patent is extended or adjusted under 35 U.S.C. 154(b) by 50 days.

(21) Appl. No.: 17/071,156

(22) Filed: Oct. 15, 2020

(65) Prior Publication Data

US 2021/0129844 A1 May 6, 2021

Related U.S. Application Data

(60) Provisional application No. 62/915,795, filed on Oct. 16, 2019, provisional application No. 62/915,808, filed on Oct. 16, 2019.

(51) Int. Cl.
*B60W 10/20* (2006.01)
*B60W 30/12* (2020.01)
(Continued)

(52) U.S. Cl.
CPC .......... *B60W 30/165* (2013.01); *B60W 30/12* (2013.01); *B60W 30/18163* (2013.01);
(Continued)

(58) Field of Classification Search
CPC .............. B60W 30/165; B60W 30/12; B60W 30/18163; B60W 2420/42;
(Continued)

(56) References Cited

U.S. PATENT DOCUMENTS

| 3,461,812 A | 8/1969 | Roland |
| 7,124,027 B1 | 10/2006 | Ernst et al. |

(Continued)

FOREIGN PATENT DOCUMENTS

| EP | 3614355 A1 | 2/2020 |
| JP | 2019-46034 A | 3/2019 |

(Continued)

OTHER PUBLICATIONS

International Search Report and Written Opinion Dated Apr. 2, 2021 for Related PCT/US20/55695.
(Continued)

*Primary Examiner* — Abby Y Lin
*Assistant Examiner* — Hossam M Abd El Latif
(74) *Attorney, Agent, or Firm* — Morrison & Foerster LLP

(57) ABSTRACT

Techniques for operating an autonomous follower vehicle that is following a leader vehicle. A desired path to be traversed by the follower may be determined from a Leader Follower Relative Pose (LFRP) derived from sensor data. A pursuit pose is derived along the desired path from the present leader pose, such as either interpolating backward or forward. As a result, the pursuit distance no longer needs to be the same as the distance derived solely from the LFRP. This permits steering controls (lateral position) to be freed from requirements to satisfy safety constraints that might otherwise be imposed by other considerations (such as longitudinal spacing between vehicles).

18 Claims, 9 Drawing Sheets

(51) Int. Cl.

| | |
|---|---|
| B60W 30/165 | (2020.01) |
| B60W 30/18 | (2012.01) |
| B60W 40/02 | (2006.01) |
| B60W 50/00 | (2006.01) |
| B60W 60/00 | (2020.01) |

(52) U.S. Cl.
CPC ... *B60W 2420/403* (2013.01); *B60W 2552/53* (2020.02); *B60W 2554/4041* (2020.02); *B60W 2554/4048* (2020.02); *B60W 2554/801* (2020.02); *B60W 2554/802* (2020.02)

(58) Field of Classification Search
CPC ..... B60W 2552/53; B60W 2554/4041; B60W 2554/4048; B60W 2554/801; B60W 2554/802; G08G 1/22
USPC .......................................................... 701/96
See application file for complete search history.

(56) References Cited

U.S. PATENT DOCUMENTS

| | | | |
|---|---|---|---|
| 8,116,921 | B2 | 2/2012 | Ferrin et al. |
| 8,352,111 | B2 | 1/2013 | Mudalige |
| 10,427,732 | B1 | 10/2019 | Carroll |
| 10,593,211 | B2 | 3/2020 | Kim |
| 11,541,889 | B2 | 1/2023 | Um et al. |
| 2009/0057068 | A1* | 3/2009 | Lin ........................... B66B 1/34 187/392 |
| 2010/0256836 | A1* | 10/2010 | Mudalige ............... G08G 1/164 701/25 |
| 2010/0256852 | A1 | 10/2010 | Mudalige et al. |
| 2013/0041576 | A1 | 2/2013 | Switkes et al. |
| 2013/0080041 | A1 | 3/2013 | Kumabe |
| 2013/0151058 | A1 | 3/2013 | Zagorski et al. |
| 2013/0166157 | A1 | 6/2013 | Schleicher et al. |
| 2015/0239473 | A1 | 8/2015 | Gosset |
| 2016/0253906 | A1* | 9/2016 | Celikkol ................... G05D 1/12 701/21 |
| 2016/0318510 | A1 | 11/2016 | Hess |
| 2017/0011633 | A1 | 1/2017 | Boegel |
| 2017/0147005 | A1 | 5/2017 | Ramm et al. |
| 2018/0050697 | A1 | 2/2018 | Kuszmaul et al. |
| 2018/0188725 | A1 | 7/2018 | Cremona et al. |
| 2018/0188745 | A1 | 7/2018 | Pilkington |
| 2018/0188746 | A1 | 7/2018 | Lesher et al. |
| 2019/0054920 | A1 | 2/2019 | Karlsson et al. |
| 2019/0084533 | A1 | 3/2019 | Kasper et al. |
| 2019/0088142 | A1 | 3/2019 | Kotteri et al. |
| 2019/0147262 | A1 | 5/2019 | Kuehnle et al. |
| 2019/0147745 | A1 | 5/2019 | Kim |
| 2019/0179330 | A1* | 6/2019 | Oniwa .................. B60W 30/10 |
| 2019/0180629 | A1 | 6/2019 | Kim |
| 2019/0196501 | A1 | 6/2019 | Lesher et al. |
| 2019/0204853 | A1 | 7/2019 | Miller, Jr. et al. |
| 2019/0206260 | A1 | 7/2019 | Pilkington et al. |
| 2019/0206261 | A1 | 7/2019 | Szymezak et al. |
| 2019/0206262 | A1 | 7/2019 | Sin |
| 2019/0225219 | A1* | 7/2019 | Ueda ..................... B60W 10/20 |
| 2019/0241184 | A1* | 8/2019 | Hayashi ............... G05D 1/0212 |
| 2019/0308625 | A1* | 10/2019 | Iimura ............... B60W 60/0011 |
| 2020/0033885 | A1 | 1/2020 | Kim |
| 2020/0042013 | A1* | 2/2020 | Kelkar .................. G05D 1/0088 |
| 2020/0057453 | A1* | 2/2020 | Laws ..................... G08G 1/22 |
| 2020/0107384 | A1 | 4/2020 | Lindner et al. |
| 2020/0241563 | A1* | 7/2020 | Van Der Knaap ....... G08G 1/22 |
| 2020/0282990 | A1* | 9/2020 | Sato .................. B60W 60/0054 |
| 2020/0284883 | A1 | 9/2020 | Ferreira et al. |
| 2020/0406834 | A1 | 12/2020 | Russell et al. |
| 2021/0034054 | A1 | 2/2021 | Patnaik et al. |
| 2021/0129843 | A1 | 5/2021 | George et al. |

FOREIGN PATENT DOCUMENTS

| | | | | |
|---|---|---|---|---|
| KR | 10-1102408 | B1 | 1/2012 | |
| SE | 201950565 | A1 | 2/2020 | |
| WO | 2007081345 | A1 | 7/2007 | |
| WO | 2015199789 | A2 | 12/2015 | |
| WO | 2017196165 | A1 | 11/2017 | |
| WO | 2018085107 | A1 | 5/2018 | |
| WO | WO-2018085107 | A1 * | 5/2018 | ............. G01S 13/66 |
| WO | 20180215910 | A1 | 11/2018 | |
| WO | 20190214828 | A1 | 11/2019 | |

OTHER PUBLICATIONS

International Search Report and Written Opinion Dated Mar. 26, 2021 for Related PCT/US20/55681.

Non-Final Office Action dated May 2, 2022 received in related U.S. Appl. No. 17/071,105.

Chien et al., "Automatic Vehicle-Following", Southern California Center for Advanced Transportation Technologies, pp. 1748-1752 (1992).

Fernandes, P., "Multiplatooning Leaders Positioning and Cooperative Behavior Algorithms of Communicant Automated Vehicles for High Traffic Capacity", IEEE Transactions on Intelligent Transportation Systems, pp. 1171-1187 (2014).

Halle et al., "Collaborative Driving System Using Teamwork for Platoon Formations", D'epartement d'informatique et g'enie logiciel Universit'e Laval, pp. 1-12.

Herrera et al., "Lateral Control of Heavy Duty Vehicles in Platooning using Model Predicitve Control", Master's thesis EX-038, Chalmers University of Technology (2016).

Kavathekar et al., "Vehicle Platooning: A Brief Survey and Categorization", Proceedings of the ASME 2011 International Design Engineering Technical Conferences & Computers and Information in Engineering Conference, Aug. 28-31, Washington, DC, US (2011).

Keßler et al., "Lane Change of Heavy-Duty Vehicle Platoons Without Lateral Position Information", IFAC Proceedings, vol. 40:10, pp. 455-462 (2007).

Kunze et al., "Efficient Organization of Truck Platoons by Means of Data Mining", ICINCO, 7th International Conference on Informatics in Control, Automation and Robotics, 70 pages (2010).

Soni et al., Formation Control for a Fleet of Autonomous Ground Vehicles: A Survey, Robotics, 7:67, p. 1-25 (2018).

Tsugawa et al., "A Review of Truck Platooning Projects for Energy Savings", IEEE Transactions on Intelligent Vehicles, 1:1, pp. 68-77 (2016).

Van de Hoef et al., "Coordinating Truck Platooning by Clustering Pairwise Fuel-Optimal Plans", Proceedings of the 2015 IEEE 18th International Conference on Intelligent Transportation Systems, pp. 408-415 (2015).

Vegamoor et al., "A Review of Automatic Vehicle Following Systems", J. Indian Inst. Sci., vol. 99:4, pp. 567-587 (2019).

Wang et al., "Model Predictive Control-Based Cooperative Lane Change Strategy For Improving Traffic Flow", Advances in Mechanical Engineering, vol. 8(2), pp. 1-17 (2016).

Campbell, Stefan, "Steering Control of an Autonomous Ground Vehicle with Application to the DARPA Urban Challenge," Massachusetts Institute of Technology Thesis, pp. 1-193 (2007).

Coulter, R. Craig, "Implementation of the Pure Pursuit Path Tracking Algorithm", The Robotics Institute, 15 pages (1992).

Dani et al., "Position-Based Visual Servo Control of Leader-Follower Formation Using Image-Based Relative Pose and Relative Velocity Estimation", American Control Conference, Hyatt Regency Riverfront, St. Louis, MO, USA, Jun 10-12, 2009.

Alvarez et al. (1999). "Safe Platooning in Automated Highway Systems Part II: Velocity Tracking Controller," Vehicle System Dynamics, 32: pp. 57-84.

Extended European Search Report dated Jul. 19, 2023, directed to EP Application No. 20876345.8; 10 pages.

George et al., U.S. Office Action dated Dec. 19, 2023, directed to U.S. Appl. No. 17/071,105; 24 pages.

(56) References Cited

OTHER PUBLICATIONS

George et al., U.S. Office Action dated Nov. 4, 2022, directed to U.S. Appl. No. 17/071,105; 61 pages.
Huang et al. (Mar. 2009). "Finding Multiple Lanes in Urban Road Networks with Vision and Lidar," Autonomous Robots, 26: 103-122.
Kelly. (2013). "Sensors for Perception," Chapter 8.3 in Mobile Robotics: Mathematics, Models, and Methods, Cambridge University Press, pp. 551-565.
Mathworks. "Pure Pursuit Controller," located at www.mathworks.com/help/robotics/ug/pure-pursuit-controller.html, visited on Dec. 6, 2023. (3 pages).
Schindler et al. "Dynamic and Flexible Platooning in Urban Areas," AAET Automatisiertes und vernetztes Fahren, Mar. 14-15, 2018, Braunschweig, Germany; 17 pages.
Stevens et al. (Feb. 1965). "Offtracking Calculation Charts for Trailer Combinations," SAE International Technical Paper 650721, located at https://doi.org/10.4271/650721; 19 pages.
Wikipedia. "Kanade-Lucas-Tomasi feature tracker," located at https://en.wikipedia.org/wiki/Kanade-Lucas-Tomasi_feature_tracker, visited on Dec. 7, 2023; 8 pages.

\* cited by examiner

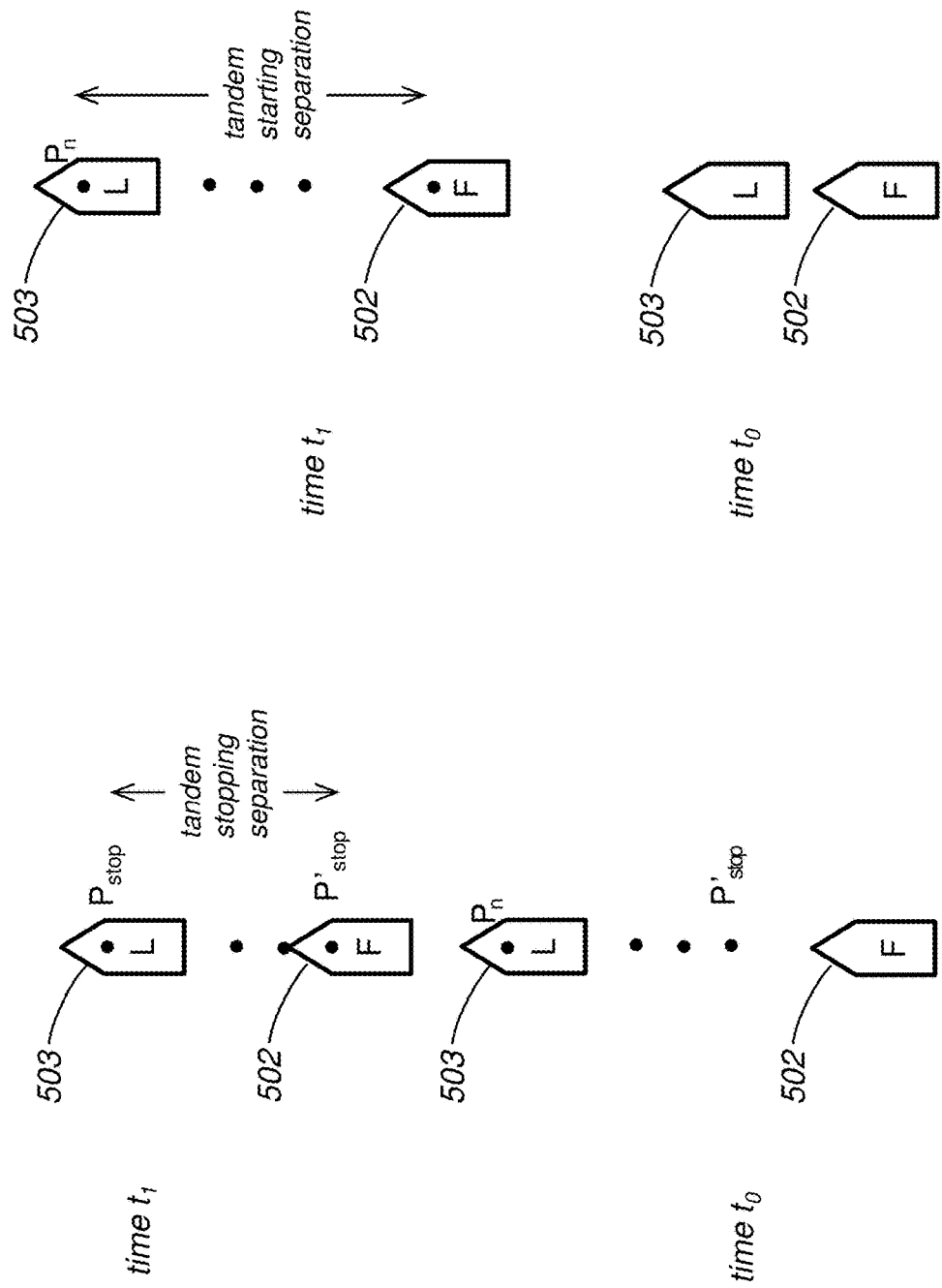

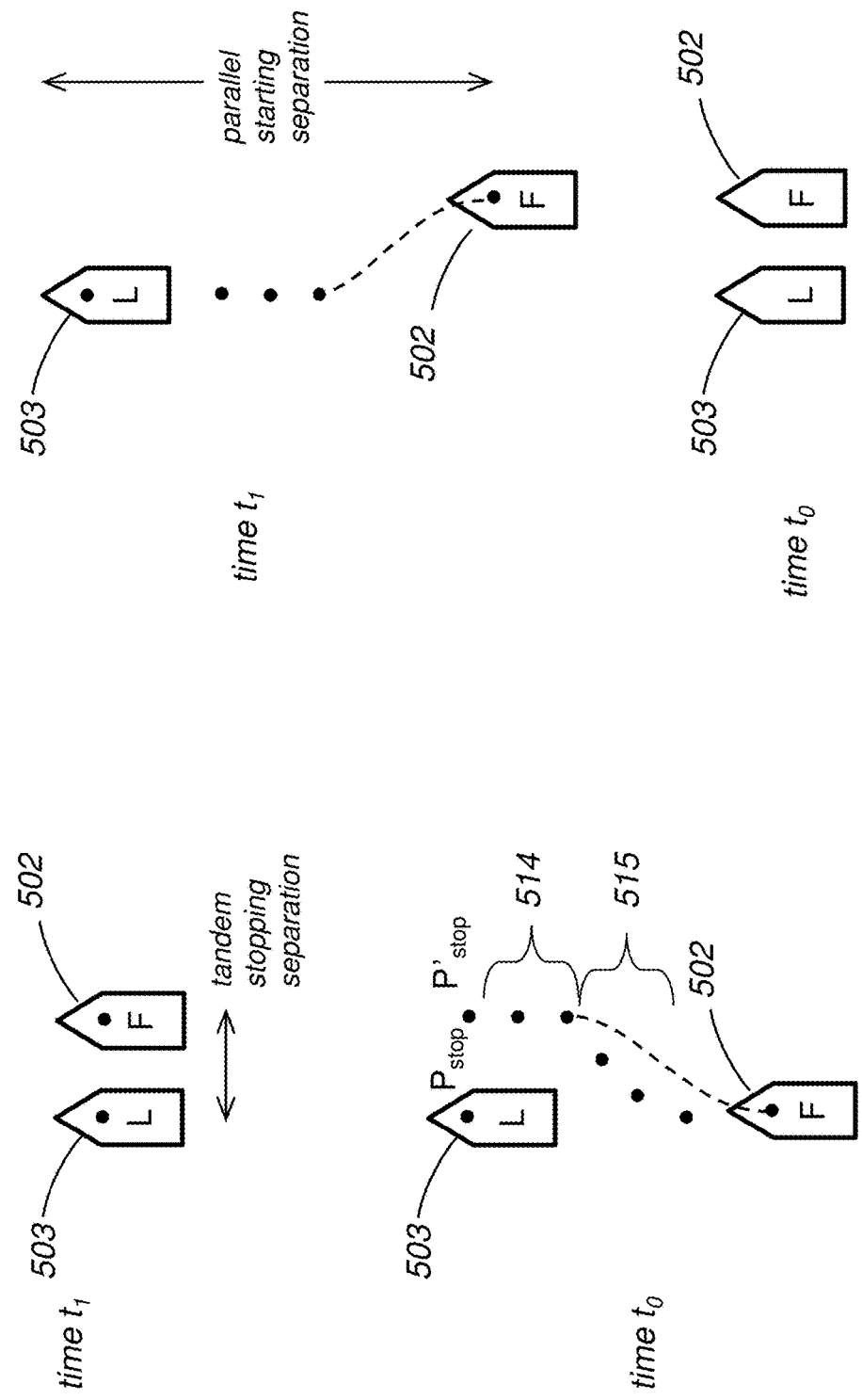

VISION-BASED FOLLOW THE LEADER LATERAL CONTROLLER

CROSS REFERENCE TO RELATED APPLICATION(S)

This patent application claims priority to a U.S. Provisional Application entitled "VISION-BASED FOLLOW THE LEADER LATERAL CONTROLLER" Ser. No. 62/915,795 filed on Oct. 16, 2019, and also claims priority to a U.S. Provisional Application entitled "REDUCING DEMAND ON AUTONOMOUS FOLLOWER VEHICLES" Ser. No. 62/915,808 filed on Oct. 16, 2019. The entire contents of each of these applications are hereby incorporated by reference. This application is also related to a U.S. Patent Application entitled "BEHAVIORS THAT REDUCE DEMAND ON AUTONOMOUS FOLLOWER VEHICLES", Ser. No. 17/071,105 filed on the same day as the present application. The entire contents of each of these applications are hereby incorporated by reference.

BACKGROUND

Certain efforts in the field of robotics in the past several decades have focused on providing autonomous control over one vehicle when it is following another. Ideally, an autonomous follower vehicle should act in the same way as if it were driven by a human, observing all traffic laws and always behaving in a predictable manner. The goals of automated driving include increased safety, reduced congestion, and reduced emissions.

As applied to commercial vehicles, such as long-haul trucking, the goals also involve energy saving and personnel cost reduction. Methods have thus been developed for operating groups of trucks along the same trajectory with only a short gap in between. Such so-called platoons or convoys may use cooperative control. They may make driving decisions by combining information from forward-looking remote sensors that measure, for example the distance and speed difference to the immediately preceding truck, with additional information communicated from that truck and other trucks ahead of it. See, for example, Tsugawa, et al. "A Review of Truck Platooning Projects for Energy Savings", IEEE Transactions on Intelligent Vehicles, Vol. 1 No. 1, March 2016, pp 68-77 for a review of several such prior efforts.

Aspects of vehicle control that involve following travel lanes have also been studied for decades. For example, Huang, et al., in "Finding multiple lanes in urban road networks with vision and lidar", *Autonomous Robots*, Vol 26, pp. 103-122 (2009) describes a system for detecting and estimating the properties of multiple travel lanes in an urban road network from calibrated video imagery and laser range data acquired by a moving vehicle. The system operates in real-time on multiple processors, fusing detected road markings, obstacles, and curbs into a stable estimate of nearby travel lanes that can be used to guide a vehicle.

SUMMARY OF PREFERRED EMBODIMENTS

The methods and apparatus described here apply to two or more vehicles travelling in formation. A follower vehicle uses non-contact "perception" sensing (such as lidar, camera, radar, etc.) to directly sense the location of another (leader) vehicle. The sensor data may then be used to derive a trajectory which determines how the follower will behave. The methods and/or apparatus can be activated whenever the aggregate of the data produced by the perception sensing is adequate.

More particularly, a desired path to be traversed by the follower may be determined from a so-called Leader-Follower Relative Pose (LFRP) that can be derived from the sensor data. However, rather than use the LFRP alone to determine a trajectory to be implemented by the follower, a pursuit point may be derived from the desired path by extrapolating from the present leader pose, such as either interpolating backward or projecting forward along the desired path. In such a case, the pursuit distance no longer needs to be the same as the distance derived solely from the LFRP.

When extrapolating backward, memory of where the leader vehicle was can be reconstructed from the history of LFRP data and the follower pose data describing its recent motion over the ground. When extrapolating forward, an analytic prediction of the motion of the leader based on its recent history can be used.

The LFRP, such as derived from leader perception inputs, may also be combined with other perception inputs, such as lane perception inputs, to provide further choice in the definition of the desired trajectory for the follower. For example, the follower can also derive a Lane Relative Pose (LRP) of itself using one or more of the sensors. The LRP is a pose of the follower with respect to the center of the current lane of travel, or with respect to some other lane that is one or more lane widths to the left or right, or an edge of the road, including how those are oriented with respect to the leader vehicle's current position.

Therefore, it is possible to define the desired trajectory of the follower based on the lane perception inputs alone (via LRP), or based on leader perception inputs to determine a path being followed by the leader (such as using a specific technique like LFRP), or based on some average or other combination of the LRP and LFRP.

A decision as to which to use may depend on detected conditions, such as whether lane markings (or barriers or a road edge) are detectable (in which case LRP alone might be used) or not detectable (in which case LFRP might be used).

BRIEF DESCRIPTION OF THE DRAWINGS

Additional novel features and advantages of the approaches discussed herein are evident from the text that follows and the accompanying drawings, where:

FIGS. 5D to 5G illustrate starting and stopping scenarios.

DETAILED DESCRIPTION OF ILLUSTRATIVE EMBODIMENT(S)

1. Introduction

The ensuing detailed description provides example embodiments only and is not intended to limit the scope of the appended claims. Various changes may therefore be made in the function and arrangement of elements and steps without departing from the spirit and scope of the claimed subject matter.

As mentioned above, the methods and apparatus described here apply to two or more vehicles travelling in formation. A follower vehicle uses non-contact "perception" sensing (such as lidar, camera, radar, etc.) to directly sense the location of another (leader) vehicle. The sensor data is then used to derive a trajectory which determines how the follower will behave. The trajectory is derived in various ways, some of which may depend on current operating conditions of the leader and/or follower. The trajectory is then used to control one or more actuators (such as steering, braking, or propulsion) on the vehicle. In one example, the methods and/or apparatus can be activated whenever the aggregate of the data produced by the perception sensing is adequate.

In a typical scenario, at least two vehicles are travelling in a convoy, with one being a leader and one being an autonomous follower. The leader vehicle is the one moving generally away from the follower vehicle. As a consequence, the follower vehicle is therefore the one that is moving generally toward the leader. In other scenarios, it may be advantageous for multiple followers to follow one ultimate leader, but where each follower considers the vehicle immediately in front of it to be its leader. In still others, one or more followers may recognize two leaders during a period of time when transitioning between them.

Returning now to the typical two vehicle scenario, the leader and autonomous follower can each be a vehicle such as a semi-truck that includes a tractor and a fifth wheel on which the kingpin of a trailer is coupled. In some implementations, a truck can be following a car, or vice versa, or a car may be following a car.

Figure 7:
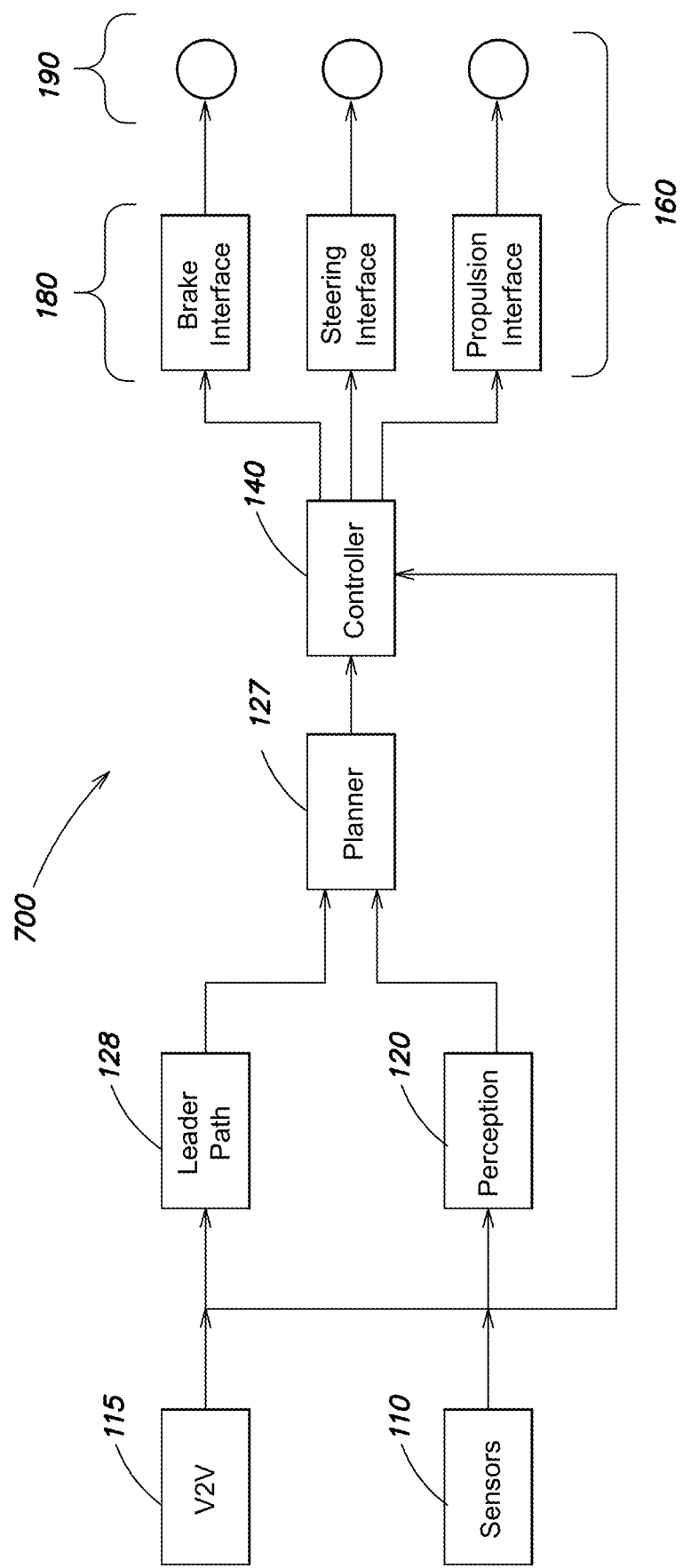
FIG. 7 is a block diagram of an electronics system that implements methods and apparatus described herein.

An electronics system that implements vehicle control may be located in the tractor and/or trailer of either or both vehicles. The electronics system may include one or more sensors, communications interfaces, autonomous controllers, and interfaces to a physical drive system. In an example implementation, one or more of the sensors and/or one or more communication interfaces (such as a wireless vehicle-to-vehicle radio link) keep the vehicles aware of each other's state and condition, to enable the follower(s) to respond to changes in the leader's direction and speed. One such example system is described in more detail below in connection with FIG. 1 and FIG. 7.

The sensors may include vision (perception) sensors such as cameras, radars, sonars, LIDARs, motion sensors such as odometers, speedometers, gyroscopes, and other sensors. At least some of the vision sensors should have fields of view that include region(s) in front of the semi-truck, other vision sensors may have fields of view that include side regions extending laterally from each side of the tractor or of the trailer, and still other vision sensors may point downward to view lane markings or other indications of the lateral extent of a road surface and/or the region that constitutes the intended lane of travel.

The electronics in the autonomous follower may also include one or more computers that process data received from the sensors, use perception logic to determine one or more conditions, and then execute autonomous planner logic depending on those conditions. The planner logic in turn provides inputs to control logic which in turn operates the mechanical components of the drive system. The drive system may include at least interfaces to propulsion, braking, and steering actuators that respond to electrical control inputs as provided by the control logic. The control logic may also directly use motion sensors such as odometers and gyroscopes to measure the motion of the vehicle.

Figure 1:
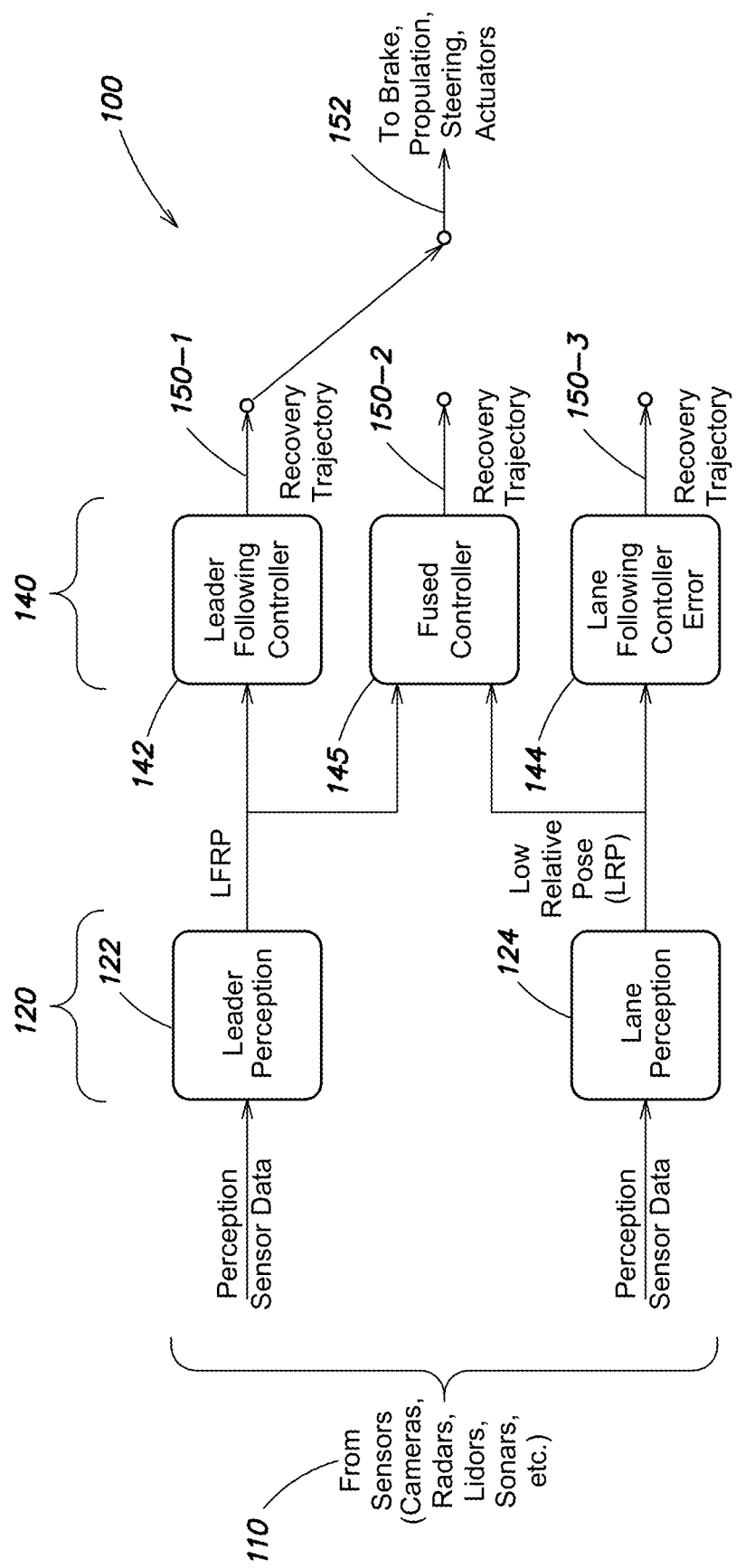
FIG. 1 is a high level data flow diagram.

FIG. 1 is a diagram of one embodiment of components of an electronics system 100 that uses perception logic and controller logic to derive one or more recovery trajectories. This approach uses perception logic 120 that includes both leader perception logic 122 and lane perception logic 124. Outputs of the leader perception logic 122 or lane perception logic 124 or both are fed to controller logic 140. Controller logic 140, which may include a leader following controller 142, lane following controller 144, and fused controller 145 then determine one or more routes to be followed that are referred to as recovery trajectories 150-1, 150-2, 150-3 (collectively referred to herein as trajectories 150). A selected one 152 of the recovery trajectories 150 is selected (such as via a weighting based on current condition inputs). The selected trajectory 152 (the execution of which may be described as a "maneuver" herein) in turn derives inputs to steering actuator(s) 160 (and/or possibly the propulsion, and/or braking actuators) on the vehicle.

One or more of these sensor outputs 110 are used by the leader perception logic 122 to determine some or all components of a Leader-Follower Relative Pose (LFRP). The LFRP depends upon the relative position and/or pose of the leader and follower, and may be determined in several ways as described in more detail below.

The phrase "some or all" is used above to reflect the practical reality that some components of a pose may not be measurable, formally known as "observable", due to limitations of the sensors used, or characteristics of the objects sensed, or the sensor-object relative arrangement, or due to other signal processing concerns such as symmetry or aliasing, or occlusion or noise levels. In some cases, for example, when no expectations about the size of the imaged object are available, the depth of an object is difficult or impossible to observe from a single camera image, but the bearing to the object (related to position left or right) may be easily observable. A case where symmetry is important is the measurement of longitudinal features on a roadway. Such measurements are often substantially unchanged, formally known as "invariant", to movement of the sensor(s) along the direction of typical motion. Examples of longitudinal features include solid and dashed lane markings, guardrails, tire tracks, lines of traffic cones, road edges etc. As a consequence of such invariance, the position or motion of a camera (or perhaps other sensor) in the longitudinal direction—that is, along the travel lane itself—is not observable. Measurements may also exhibit aliasing because, for example, one dashed lane marking (or e.g. traffic cone) looks the same as another after moving one dash length along the road. In the case of longitudinal features, it is typically still possible to observe the position of the camera in the lateral direction in addition to its orientation relative to the lane markings. Indeed, the limited observability is not a difficult limitation for lateral control (e.g. steering) purposes because the longitudinal coordinate is typically not relevant to lane following.

A Lane Relative Pose (LRP) may also be determined by the same sensors 110 or some different subset of the sensors 110. As explained in more detail above, some or all components of the LRP may be observable at any moment, and all references to pose or position measurement herein do not mean to suggest that all components of the pose are necessarily observable. As explained in more detail below, the LRP is a pose of the follower vehicle with respect to the center of the current lane of travel, or with respect to the lane one or more lane widths to the left or right, or an edge of the road, including how those are oriented with respect to the vehicle's current position. For example, the follower may be following the leader from an adjacent lane, in which case the LRP will be a pose of the follower with respect to the adjacent lane. Thus "offsets" can also be applied during continuous motion as well as during start/stop and other maneuvers discussed elsewhere herein. Various ways of determining LRP are also described in more detail below.

As shown in FIG. 1, there may be several possible operational modes. In one mode, a first recovery trajectory 150-1 is determined by a Leader Following Controller using only the LFRP. In another mode, another recovery trajectory 150-2 is determined by a Lane Following Controller using the LRP. In yet another mode, a fused controller 145 uses both the LFRP and the LRP to determine a third recovery trajectory 150-3.

In other words, it is possible to steer the vehicle based on the lane marking (LRP), or based on a path being followed by the leader (LFRP), or based on some average or other combination of the two.

The approach can be valuable because it can provide lateral (e.g. lane center relative) state estimation and (e.g. steering) control:

In situations where a secondary steering controller is desired whose outputs will be merged with those of a steering primary (e.g. lane following controller) controller in some fashion.

In situations where existing lane markings are momentarily or persistently inadequate for safe operation of an autonomous vehicle.

In situations where it would be useful to derive a warning message for a human driver from the calculations that such a controller performs, even if it is not presently operating in a mode where it is controlling the steering.

Advantages in lateral control can be realized with the above approach, regardless of how the longitudinal (speed) control is conducted. A human driver or another, different control algorithm may now be used for the purpose of longitudinal control. In particular, a speed control policy can be implemented using well-known methods similar to adaptive cruise control and based on the error in the longitudinal coordinate of the LFRP.

2. Leader Following Controller 142

A method or apparatus that implements lateral control based on perception of the leader and follower position, such as the leader following controller 142, can thus be generally described as follows:

Non-contact leader perception sensors (cameras, lidars, radars etc. 110) on a follower vehicle are used to determine some or all parts of a leader-follower relative pose (LFRP). This is the pose (position and orientation) of the leader vehicle relative to the follower. This process of using sensors to continuously determine the pose (position and orientation) of an object which is in view of those sensors will be called sensor-based positional tracking.

The follower vehicle is steered so as to cause the follower vehicle to drive substantially the same path that the leader has already driven. More precisely, that means that a specified reference point on the follower vehicle follows substantially the same path through space that a specified reference point on the leader has driven.

In one embodiment for following a leader, the leader-following controller logic 142 in the follower executes any steering policy that causes the follower to converge over time onto, and thereby follow the path of, the leader. Example steering policies may include pure pursuit, pose pursuit, adjustable pursuit distance, and other steering policies.

2.1 Pose Pursuit

Some possible control embodiments can be understood as variations on a more fundamental steering policy, that will be called "pose pursuit", described herein below. Pose pursuit is itself a generalization of a known approach called "pure pursuit" (See reference [1] below). Pure pursuit allows one wheeled vehicle to follow a desired path while accommodating the fact that wheels do not normally permit sideways motion. Pure pursuit is a tracking algorithm that works by calculating the curvature that will move a vehicle from its current position to some goal position. The point is to choose a goal position that is some distance ahead of the vehicle on the desired path. One can think of the vehicle as chasing a point on the desired path some distance ahead of it—it is "pursuing" that moving point. This "lookahead" or "pursuit" distance may change as the vehicles follow the twist of the road and vision occlusions.

While pure pursuit does not try to move the vehicle instantaneously sideways, it does generate a recovery path that will eventually cause the follower vehicle to acquire the desired path after driving a short distance. It does so by exploiting a mathematical analogy of one animal chasing another. In particular, a pure pursuit controller is a steering policy that continuously steers the follower vehicle toward a "pursuit point". This point is on the desired path but it remains, at all times, some distance (the "pursuit distance") ahead of the follower vehicle that is doing the "chasing".

Conversely, pose pursuit generalizes the pursuit point to a pursuit pose (in other words, it additionally considers the direction of the path tangent and/or curvature at the pursuit point). Pose pursuit becomes an embodiment of a follow-the-leader controller when one vehicle is identified with the follower and the pose of the lead vehicle is used as the pursuit pose. The pursuit distance is then closely related to the LFRP. More generally, in follow-the-leader, the path of the leader (the sequence of positions, headings, curvatures etc. expressed over time or distance) is identified with the desired path and the pursuit pose can be any suitably chosen pose on that path, whether or not the leader is presently occupying that pose.

2.2 Basic Steering Policies

The steering policy can be more advanced than simply "steering toward" the lead vehicle. In another embodiment, a well-defined recovery path is used that a) starts at the follower pose (on the ground) and b) terminates at a pursuit pose, or near the pose of the leader (on the ground). The recovery path can be designed to satisfy one or more constraints derived from the pursuit pose, where satisfying more constraints is denoted a higher "degree of continuity". If the recovery trajectory is an arc (low degree continuity), it can always intersect the path at the position of the pursuit pose but it cannot, in general, achieve the heading and curvature of the pursuit pose.

The recovery path may also be of an arbitrary and more general form, including any form that additionally terminates at the heading and/or the curvature of the pursuit pose, thereby exhibiting a higher degree of continuity.

Some embodiments may use a recovery path whose geometry is also feasible for execution by the follower vehicle. So, in other words it can be advantageous to produce recovery paths that are both feasible and of high degree continuity.

2.3 Adjustable Pursuit Distance

When following a desired path with a wheeled vehicle, using pure pursuit, it is also known that the lateral error incurred at any desired path curvature often depends strongly on the pursuit distance [2]. Relatively short distances can cause oscillations but relatively long ones can approximate and execute corners or areas of high curvature on the desired path using lower curvature approximations that "cut the corner".

However, there may be longitudinal constraints (for example, stopping distance) that limit the allowable pursuit distances and none of the allowable distances may be best from a lateral error point of view. Consequently, it can be valuable to derive a pursuit distance from the desired path (that of the leader vehicle) but which is also neither the actual "line of sight" distance, nor the arc length of the recovery path, to the leader at any given moment.

In another embodiment, the pursuit pose is derived from the desired path by extrapolating from the present leader pose either backward or forward along its path. In such a case, the pursuit distance is no longer the same as the distance derived solely from the LFRP.

When extrapolating backward, a record of where the leader vehicle was on the ground can be reconstructed from the history of LFRP data and the follower pose data describing its recent motion over the ground. When extrapolating forward, an algorithm can be used that analytically predicts the motion of the leader based on its recent history and a predictive model of how the vehicle moves.

2.4 Implicit Pursuit Point

When errors (i.e. the deviation of the follower vehicle from its desired path in terms of lateral, heading and curvature error) are small, it is also known that an explicit representation of the pursuit point can be avoided in favor of an approximation. Indeed, if the road lane has a curvature of $\kappa$lane and the lateral error is y and the heading error is q, an arc that reacquires the desired path at a distance of L forward of the follower has a curvature $\kappa$PP given by:

$$\kappa PP = \kappa lane + 2y/L2 + 2*q/L$$

By using this formula as the basis for its controller, the follower can adjust the effective gain applied to the heading and lateral error without ever explicitly computing a lookahead point. Furthermore, the distance to the (implicit) lookahead point can be adjusted by simply adjusting the quantity called L. When L is smaller, the follower tries to reacquire the desired path after travelling less distance than when L is larger.

Indeed, the above formula is simply a linearized state space controller applied to the instantaneous path following error. It produces an arc as the corrective trajectory but higher levels of continuity are also achievable based on the assumption that the lane itself is substantially an arc or merely substantially smooth over short lookahead distances.

2.5 Other Control Strategies and Common Element of Embodiments

Any number of other standard control strategies (as distinct from feedback based on LFRP as described herein) can be applied either as an alternative to or in addition to the basic methods herein. Such strategies include the use of hierarchy, feedforward, predictive modelling and optimization, intelligent control, observers, adaptive control, robust control etc.

One common element of these embodiments is to use (only or primarily) the sensing available on the follower to perform any form of estimation that combines, in logic based entirely in the follower:

the measured, remembered, interpolated or predicted motion of the follower relative to the ground (road), the measured, remembered, interpolated or predicted motion of the leader relative to the follower, to form an explicit representation or an implicit understanding, in the follower, of its path following error—that is, its position relative to the path that was followed by the leader.

The main purpose of doing so is to decouple the distance to the lead vehicle (which cannot be chosen to optimize or satisfy path following performance concerns) from the effective distance that the follower will use in order to compute a recovery trajectory on a continuous basis.

It may be irrelevant whether the leader's path and the follower pose are represented in ground-fixed coordinates or whether the leader's path is expressed in follower coordinates. What is important is that the follower knows to what degree it is not following the path of the leader. Two embodiments for expressing this path following error may be (a) a lookahead point (or pose) or (b) the content of an error vector in state space. In principle any quantity or quantities that vary when the follower is moved relative to the desired path can be used to represent the following error.

2.6 Other Constraints and Objectives

In some scenarios it may be important, valuable, or necessary for the leader following controller 142 to consider other matters in addition to the path following error.

In one scenario the follower is surrounded by objects that pose a risk of collision on a continuous, momentary, or intermittent basis. For example, jersey barriers that bound a temporary lane in a highway construction zone are continuously near the follower, pedestrians, parked cars, animals or construction vehicles may be momentarily nearby and other traffic appears intermittently.

In many of these cases motion planning and control task(s) of the follower can be defined to impose arbitrary combinations of additional:

constraints that must be followed (like do not collide with the jersey barriers) or objectives that must be pursued (like stay as far as possible from nearby traffic)

and techniques to pursue all objectives at once while also satisfying constraints are known in the art of autonomous vehicles.

2.7 Offsets to the Leader's Path

Given the capacity of the leader perception logic 122 to construct the path of the leader from perception and motion data available on the follower, many other embodiments are easy to accomplish and they enable useful behaviors.

Several useful behaviors contemplate a plurality of vehicles where the follower vehicles are following paths that are deliberately offset from the path of their respective leaders. The elements that are needed in this scenario include:

The capacity to define a desired path that is offset in a desired manner from that of the leader. This can be accomplished by allowing new path points to be derived to the left or right (i.e. laterally) or forward or backward (i.e. longitudinally) of measured or extrapolated points on the leader's path, potentially including the start point and the end point. It may also be useful in other behaviors to derive new path points by offsetting them somewhat in both longitudinal and lateral directions.

This is not to suggest that paths are necessarily expressed, represented, or manipulated as points in the leader following controller 142 or the perception logic 122 or anywhere else in the embodiment. Continuous curves (e.g. curvature polynomials), intervals of independent variables, splines, or other representations of paths may be used. However, points are used in the discussion below as a means to describe to the reader how paths may be offset.

An example of where it may be valuable to offset the leader's path is in a scenario where a lane change maneuver has failed in the sense that the follower has found itself alone in its lane and it must keep track of the leader in an adjacent lane and remain behind it until the situation is resolved. Yet another example is a scenario where a convoy is being formed or a new leader has arrived adjacent to its intended follower. It may be valuable in such a case for the follower to follow the leader in an adjacent lane while remaining behind it.

2.8 Stopping and Starting Trajectories

In addition to the above behaviors based on offsetting the leader's path, several other useful behaviors contemplate a plurality of vehicles that either starts from rest in some formation and then forms a convoy or perhaps starts in a convoy and comes to rest in some desired rest formation. The elements that are needed in this scenario include: The elimination of any assumption that the vehicles are moving continuously. This can be accomplished by embellishing path points with a desired speed, which may be zero.

Consider a case where the leader comes to a stop in a highway rest stop, a weigh station, a toll booth, on the shoulder of the highway, or on the side of an exit ramp as shown in FIG. 5D. The follower 502 may detect or be informed by the leader 503 of this impending stop and it may choose or be directed to come to a stop behind the leader (tandem formation). In such a case, the follower computes or is provided with the position of a follower's stop point P' stop which is derived from the leader's intended stop point Pstop. The follower's stop point could simply be an interpolated pursuit point that is positioned at a tandem stopping separation behind the leader's stop point on the leader's path, or it may be positioned at a tandem stopping separation directly behind the leader. Once the follower 502 knows that it is supposed to stop, it gradually changes its pursuit distance and its velocity so that it comes to a stop at the follower's stop point.

Conversely, the opposite case is one where the leader vehicle begins to move while the follower, initially stationary, continues to track the motion of the leader with its sensors until it deems itself ready, or it is instructed, to start following.

This tandem start maneuver is shown in FIG. 5E. In this case, the follower 502 may detect or be informed by the leader 503 that the convoy is to commence moving shortly. In this case, the follower may wait until the leader is positioned at a tandem starting separation before it commences moving. This separation may be measured in any convenient manner, whether it is a line of sight distance or a distance along the leader's path.

FIG. 5F shows a parallel stopping maneuver. In this case, the follower 502 may detect or be informed by the leader 503 of this impending stop and it may choose or be directed to come to a stop beside the leader (parallel formation). In such a case, the follower 502 computes or is provided with the position of a follower's stop point P'stop which is derived from the leader's intended stop point Pstop and perhaps from some other points that immediately precede it. These offset leader path points 514 (two extra are shown in the figure) serve to inform the leader following controller 142 of the shape of the leader's path immediately before the leader 503 stops.

The fact that these offset leader path points 514 are offset will cause the leader following controller 142 to generate corrective trajectories to steer the follower to follow the offset path.

The follower's stop point P' stop could simply be an interpolated pursuit point that is positioned at a tandem stopping separation behind the leader's stop point Pstop on the leader's path, or it may be a tandem stopping separation positioned directly behind the leader. Once the follower 502 knows that it is supposed to stop, it gradually changes its pursuit distance and its velocity so that it comes to a stop at the follower's stop point P'stop.

The parallel start maneuver is shown in FIG. 5G. In this case, the follower 502 may detect or be informed by the leader 503 that the convoy is to commence moving shortly. In this case, the follower may wait until the leader is positioned at a tandem starting separation before it commences moving. This separation may be measured in any convenient manner, whether it is a line of sight distance or a distance along the leader's path.

It should be understood that the four starting and stopping trajectories discussed above are examples where the offset of the leader's path occurs in only one of the lateral or longitudinal directions. Of course, maneuvers that start and stop from arbitrary relative positioning, including that of parallel parking, perpendicular parking, and angle parking may be generated similarly and they may be useful. The leader's path points may, in general, include orientation information (i.e. poses) or such orientation information may be derived from the path tangent direction. In such a case, even an angular offset between leader and follower path poses can be defined.

As long as points on the leader's path can be expressed (explicitly or implicitly) and appropriately offset, the lateral control discipline used at any moment in stopping and starting trajectories may be any combination of disciplines discussed above. For example, measurements of the lane center offset of the leader may be offset by slightly more than a vehicle width and measurements of the line of sight distance to the leader may be converted to ground fixed coordinates and offset by more than a vehicle length.

The basic path following scenarios described above may suffice to generate appropriate behavior of the follower, perhaps augmented by constraints to avoid collisions with nearby objects while recovering the leader's path, or an offset version of the leader's path. However, there are two other practical considerations: path discontinuity and leader collision avoidance.

Consider first path discontinuity. If the lateral control discipline cannot tolerate a large magnitude of a lateral shift of the leader path points, the offets of these points may be intentionally smoothed in region of transition 515 to remove any such discontinuity. Such a region is illustrated in FIG. 5F for one trajectory but such smoothing can be used anywhere that it is necessary given the characteristics of the lateral control discipline(s) in effect.

Consider next collision avoidance. In one embodiment, the intrinsic obstacle avoidance capacity of the follower 502 will avoid any such a collision while following its intended path, because the leader can be treated as just another obstacle to avoid. In another embodiment, the timing of the motion of the vehicles is controlled such that collision is averted. This was the case when the follower waited, for example, until the leader was at a parallel or tandem starting separation in the above examples. In yet another embodiment, the path of the vehicles is derived in such a manner that the follower path intrinsically avoids collision. In such a case, leader and follower paths do not overlap as a matter of geometry. For example, in FIG. 5F, the offset leader path points 514 extend sufficiently far behind the leader 503 such that the follower 502 never comes too close to the leader 503.

2.9 Perception and Modelling Embodiments

As explained above, the leader perception logic 122 is responsible for measuring a Leader-Follower Relative Pose (LFRP). Methods for doing so will now be described in more detail.

A Model of Image Formation (MIF) may be used in determining LFRP or LRP. Numerous sensor modalities can be used, individually or in any combination, to do this. It is known, for example, from [3] that cameras can be used to extract bearing information from an image of another vehicle, and that lidars and radars can be used to extract range and bearing information.

The measuring method used may or may not employ a tracker (e.g. such as the KLT tracker in reference [4]) to boost its efficiency and robustness. A Kalman filter or other estimator may also be used, particularly if measurements of the motion of the camera between frames are available and/or there is a desire to estimate such motion. In any case, for determining LFRP, some attributes of the region of sensor pixels corresponding to the leader are first identified in an image (more generally, a frame of data) and the relative pose of the leader is computed based on inverting a model of image formation (MIF) that can express how those attributes would depend on the LFRP. What is meant by inverted the MIF is that the inverted MIF can express how the LFRP would depend on those attributes. The attributes may be, for example, properties of regions integrated over the entire area of the pixels (moments), or edges of intensity or depth either inside or on the boundaries of the region, or the peak of a cross correlation of a predicted region with the measured one, or any other observable attribute that depends on the LFRP.

Similarly, for determining LRP any suitably LRP-dependent and observable attributes of the region(s) of pixels corresponding to the lane markings or the space(s) between the lane markings can be computed. The model of image formation can then be used to determine the geometry of the lane markings (e.g. curvature), and/or the position and orientation of the lane markings relative to the vehicle, or equivalently the position and orientation of the lane center relative to the vehicle, or equivalently the position and orientation of the vehicle relative to any part of the lane.

2.10 Use of a Model of Vehicle Geometry

In precise terms, to have one vehicle follow another, one preferably specifies precisely which "reference" point on the follower is to follow precisely which "reference" point on the leader. It is typical to choose the center of the rear axle of an Ackerman steered vehicle (like an automobile) for convenience, but any other choice of a reference point location on any kind of vehicle may be preferred.

In practice, a simple MIF will depend on the pose of the visible (to the sensor) parts of the lead vehicle relative to the sensors on the follower. In another embodiment, the MIF also accounts for a) the pose of the sensor(s) relative to the follower reference point and it also accounts for
b) the pose of the visible surface of the leader relative to the leader reference point. For example, it is possible with a knowledge of the geometry of a tractor-trailer to derive a reference point other than the rear doors of the leader trailer (such as the rear axle of the leader tractor), even when the only image available is of the rear doors of that trailer.

2.11 Use of a Kinematic Steering Model

The rear wheel of a vehicle (and hence the visible rear surface) often follows a path which is offset toward the center of a turn. Such an "offtracking" offset depends on curvature and other aspects of motion in a fairly predictable manner [5]. Therefore, another embodiment may preferably determine the pose of the leader reference point based on both a) the pose of the leader surfaces that are visible, and b) models of both the geometry of the leader and of how its offtracking depends on curvature.

2.12 Use of a Wheel Slip Model

Similarly, another embodiment may compensate for the wheel slip that is caused by the lateral acceleration of turning or the equivalent effects of disturbances such as wind speed or other disturbances. Such compensation may be used to adjust the recovery trajectory used by the follower or to adjust the leader motion extrapolation/interpolation process (as described below) used to find the pursuit pose, or both.

2.13 Leader Follower Relative Pose (LFRP) with Adjustable Pursuit Distance

Figure 2:
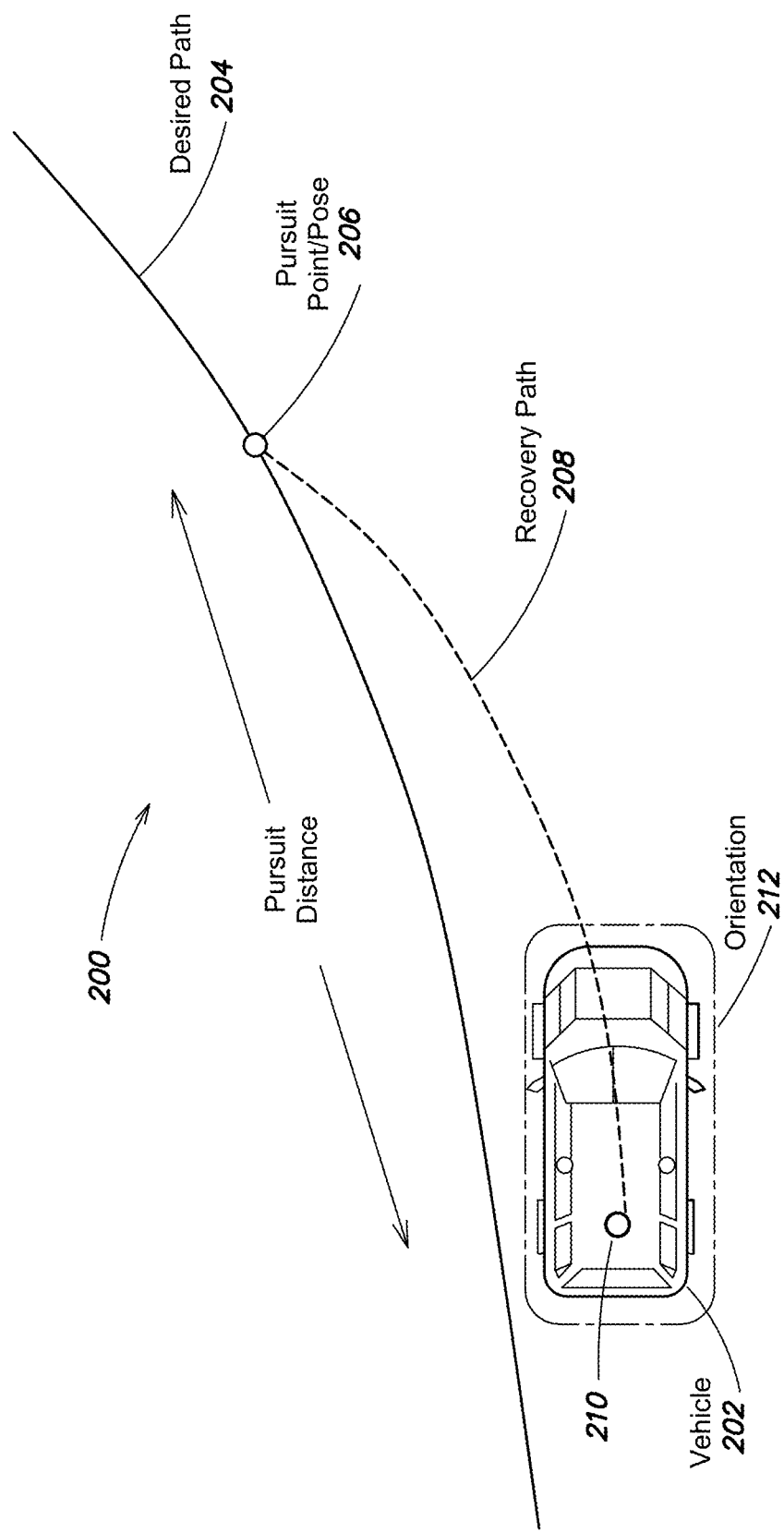
FIG. 2 illustrates a recovery path and pure pursuit and pose pursuit.

An understanding of pose pursuit and pure pursuit help to appreciate what is meant by Leader Follower Relative Pose (LFRP) by referring to FIG. 2 while still also referring to FIG. 1. FIG. 2 illustrates a situation 200 where a single vehicle 202 is currently off of a desired path 294. Perception logic 120 in the vehicle is executing pose pursuit or pure pursuit 206, where the controllers 140 have some sense for the shape of the desired path 204.

The desired path 204 may be determined from vision sensors (e.g., those looking ahead and/or to the side and/or behind on a road), or it can be desired path information is received beforehand from some other source, such as a route planner. In addition to knowing a desired path 204, the trajectory planner also has a sense for the current vehicle's state—the important components of which are its position and orientation (also called its "pose"). In other words, the two inputs used to determine a pure pursuit or pose pursuit trajectory may be a desired path 204 and a current position 210 and orientation 212 with respect to that path.

This approach of using a recovery path 208, in effect accommodates the fact that a typical vehicle's wheels do not permit sideways motion, by instead steering directly towards a point forward on the desired path.

Figure 3:
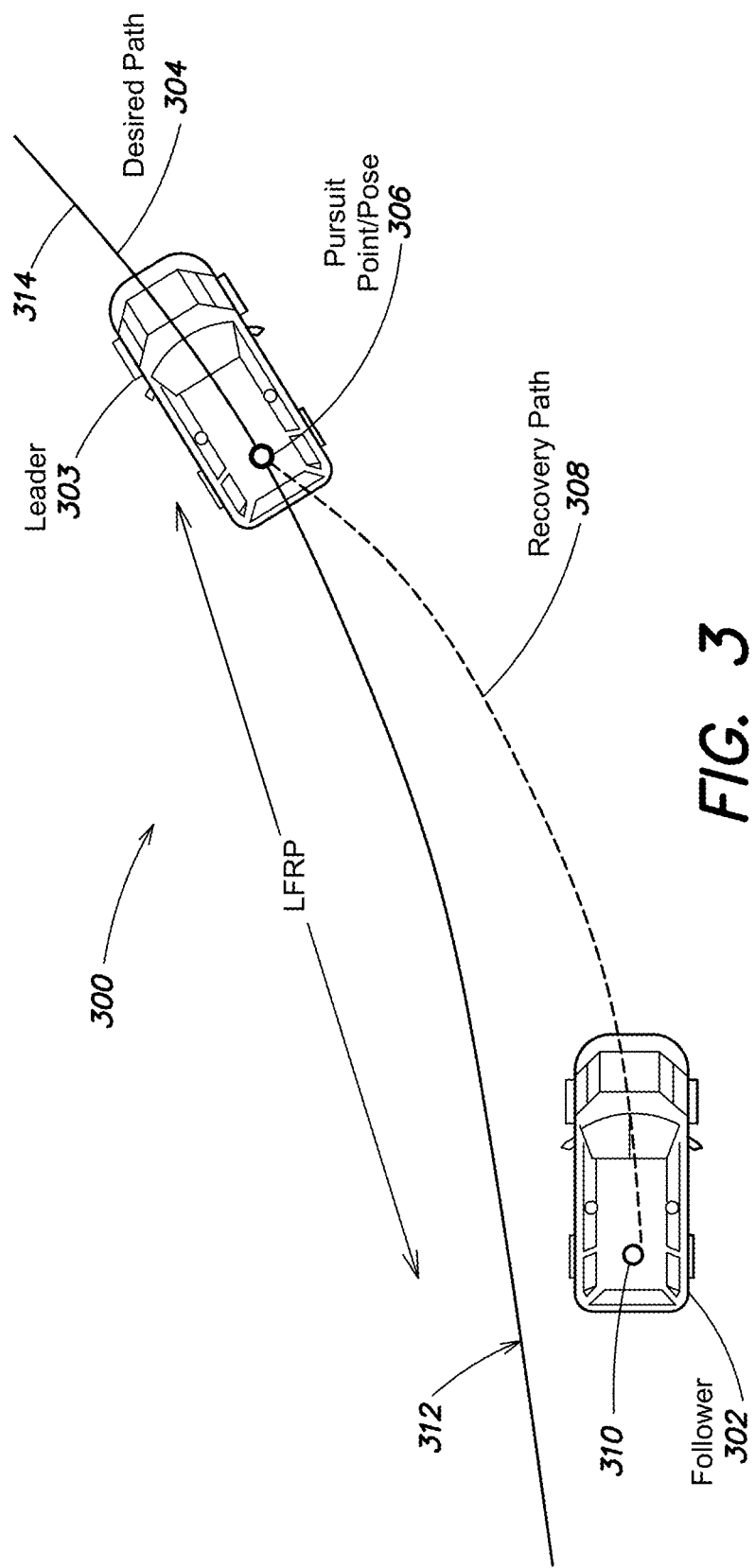
FIG. 3 illustrates a recovery path that depends on follow the leader.

The determination of a pursuit point/pose 206 and recovery path 208 becomes a bit more complex in a situation 300 such as shown in FIG. 3, that we call Follow the Leader. In this situation, a follower vehicle 310 is tasked with joining the path of a leader vehicle while both are on the move. When following a leader 303, the desired path 304 at any moment is composed of the actual path 312 of the leader 303 up to the present and a prediction 314 of its path into the future. Here the pursuit point/pose 306 changes somewhat unpredictably over time (it being dependent on the behavior of the leader 303), and thus adjustments to the recovery path 308 should also be made periodically as both vehicles 302, 303 move. In one scenario involving motor vehicles, it may be desirable to recalculate the pursuit point/pose 306 at a rate of 100 times a second. Each calculation determines that the recovery path 308 (represented by the dotted line) is essentially an arc that corresponds to a fixed steering angle. The controller in the follower 302 (e.g., leader follower controller 142) thus keeps setting the steering angle equal to whatever is needed to travel from the current pose 310 to the pursuit point/pose point 306. In this way, the follower vehicle will eventually be travelling on the desired path 304 with the desired pose (e.g., the same as the pose of the leader 303).

Figure 4:
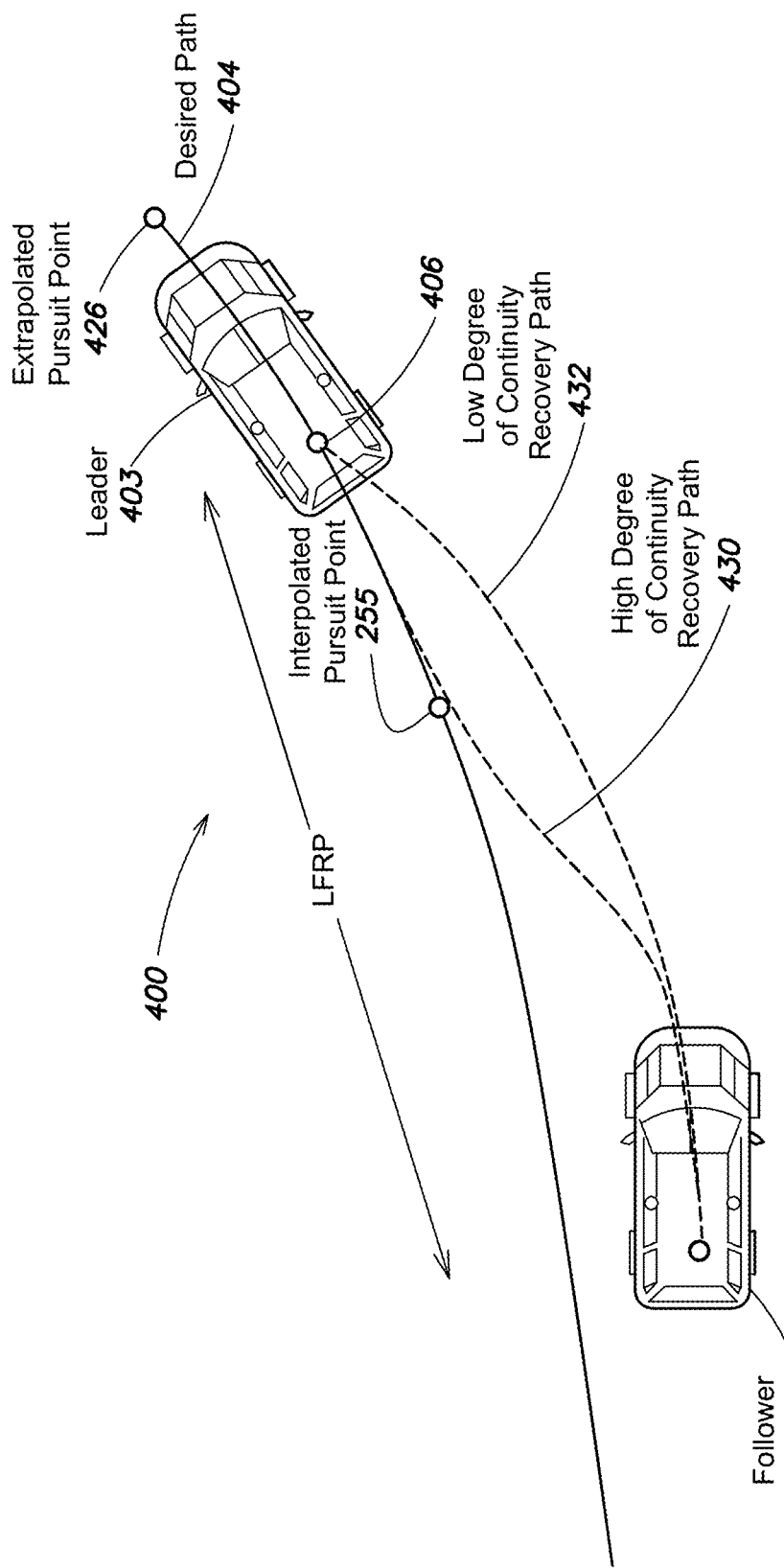
FIG. 4 illustrates a recovery path that depends on an adjustable pursuit distance.

FIG. 4 is another approach 400 for determining a trajectory with some advantages that we call Adjustable Pursuit Distance. This uses the position of the leader 403 as a starting point for determining a recovery pose. However, another point 426 that we call the extrapolated pursuit point is determined based on interpolation or extrapolation from the leader's current position 406, such as by moving forward or backward on the desired path 404. With this approach, the follower 402 is freed from using a pursuit distance equal to the distance to the leader, and can instead use a more arbitrary pursuit distance that is nonetheless still associated with a pose on the desired path 404.

In the example shown in FIG. 4, an extrapolated (or respectively interpolated) pursuit point 426 is chosen to be a location forward (or respectively rearward) of the leader 403. This pursuit point 426, of course, also moves as the leader 402 moves). The pursuit point 426 may then be used to determine how to adjust the follower's 402 steering input.

The example in FIG. 4 also shows the option of using a high degree of continuity recovery path 430. In the example shown, this type of recovery path, if executed in its entirety, results in a series of steering inputs that are sharper at the beginning (e.g., sharper towards the left in this example) but then becomes asymptotic to the desired path 404, as the follower 402 more closely assumes the same orientation as the leader 403. In reality, the recovery path 404 is not executed in its entirety because it is recomputed at high rates. The steering inputs in the example path pass through a point of zero steering angle and even become slightly to the other direction (that is to the right in FIG. 4) as the follower 403 converges onto the desired path 404. As a result, the variation in steering input results in a high degree of continuity where the recovery path 430 joins the desired path 404, as opposed to the lower degree of continuity path 432 that would be experienced using the pure pursuit approach of FIG. 3 when the steering is constant.

Thus, in this approach 400, the follower 402 not only derives (or is given) a desired path 404, but also determines an extrapolated (or interpolated) pursuit point 426 which happens to be in front of or behind where the leader 403 is, at the moment, on that path 404. Also note again that the follower 402 does not drive the entire length of any of the periodically calculated recovery trajectories. It only drives along a tiny piece of them, and then periodically recomputes a new one with a new extrapolated pursuit point 426 or pose.

The pursuit point 426 (whether extrapolated or interpolated) should be "suitably chosen" based on the operating conditions. For example, if the pursuit point 426 is too close to the leader 403, it can cause the follower's 402 actions to become unstable. Suitability here will depend on the vehicle(s) maneuverability, which depends, in part, on tire wear and road conditions, and the degree of sharpness (aggressiveness) of any turns along the desired path.

Consider the advantages of a high degree of continuity path 430 achieved. Returning attention to FIG. 3, note that the recovery path 303 is an arc. If the follower vehicle 302 were to simply follow that arc, and make it all the way to the pursuit point 306, the follower will actually then be pointing in a somewhat wrong direction (in a direction too far to the left in the example of FIG. 3). Thus the recovery path 308 in FIG. 3 has a low degree of continuity with the desired path 304, since the follower 302 must now execute a sharp right turn to be pointed in the correct direction. Compare that with the FIG. 4 high degree of continuity situation, where as the two curves converge, namely the dotted line and the solid line, as the follower 402 tends to get closer to the pursuit point 426, also tends to be more closely heading in the desired correct direction.

It should be noted that the follower 402 does not steer "directly" towards the leader 403, since the distance between the leader and the follower is probably better governed by safety and economic issues with collision, braking distance, fuel efficiency and other considerations taking precedence. By separating the point that the follower 402 is steering towards from the actual position of the leader (that is, by selecting interpolated or extracted pursuit point 426 which is not necessarily where the leader 403 is), it is now possible to control longitudinal separation between the vehicles to be that which is best from a fuel efficiency point of view, while at the same time choosing the distance of this pursuit point 426 to be optimal from a smoothness of control point of view.

In other words, decoupling control over the distance to the pursuit pose from control over the distance to the leader, permits the "distance to leader" needs to be enforced by concerns other than the "best performance of the steering controller".

In some implementations, a Model of Image Formation (MIF) can be used by the perception logic to determine a current pose of the leader relative to the follower (LFRP). For example, the perception logic may "invert", as described above, the MIF given an image of the back door(s) of the leader taken from a camera on the follower. This is referred to as the door to camera relative pose (DCRP). The DRCP can be converted to the LFRP, by (a) accounting for the position of the leader tractor relative to its door(s) and (b) accounting for the position of the follower camera relative to the follower's tractor.

In a case where the leader is a tractor-trailer, it may be desirable to use a reference point that is some location other than the back doors of the trailer, such as the rear axle of the tractor. In this instance, since the only object in view may be the rear doors of the trailer (which are not the actual reference point), there will be additional transformations needed to determine how the position of the rear doors differ from the reference point on the leader. For example, because tractor-trailers are articulated at a fifth wheel, and if the leader reference point is the rear axle of the tractor, the model of image formation should also determine when the leader's tractor and trailer are articulated in other than a straight line, in order to compensate for the offtracking that occurs during turning.

In order to effectuate a turn, the wheels of any vehicle will distort (even ever so slightly), meaning that the wheels tend to deflect toward the outside of a turn by some small amount. This sideways slippage due to lateral acceleration is somewhat independent of how heavy the vehicle is. Wheel slippage may also be a consideration in determining a pose of the leader or controlling the motion of the follower.

Consider where the leader is following a particular curved path. Consider also, as has been explained above, that due to articulation of the tractor and trailer, the exact path of the leader's rear doors will be different from the path that the tractor's rear wheels follow. Given a model of wheel slip, the offtracking of the leader can be compensated while it happens in order to better determine the pose of the leader reference point from the pose of its rear door.

A model of wheel slip (which may be a component of the MIF or some other aspect of the perception logic) can also help the follower control its motions more precisely. When the follower desires to execute a curved path, the follower trajectory may ask for a bit more turning angle, because whatever inputs are applied, in reality there will be less actually achieved. The amount of compensation for slippage may depend on a number of factors such as how sharp the turn is, or how fast the vehicles are moving, and the vehicle(s) relative maneuverability.

Wind is another factor that may be adjusted for. In general, human drivers of tractor trailers will slow down or even cease operating in high winds conditions, especially if a trailer is empty. But the effect of wind can be treated in a similar way as the lateral acceleration example just described. If this condition can be detected (such as via a pitot tube, or by a vision system which detects swaying in the leader's position relative to its lane, or by receiving a weather report from a wireless interface, etc.), the trajectory planner can oversteer or understeer by an appropriate amount to make path following error tend to go away. And if the planner detects that the follower is not achieving the expected corrections, it can be deduced that some external disturbance is occurring.

3. Lane Following Controller 144

3.1 Overview

In some embodiments, markings on the road (or other indicia such as jersey barriers, traffic cones, road edges, etc.) as provided by lane perception logic 124 may be used by the lane following controller 144 to assist the follower to choose, attempt, or desire to remain between the lane markings of its current or intended lane of travel while also following the path of the leader.

As described elsewhere herein, such lane following behaviors can be suspended and the follower may choose to simply follow the path of the leader (that is, using only the Leader Following Controller 142) while the leader changes lanes. The leader's path in this case may be defined in terms of the leader's path on the road, the leader's path relative to the follower, or the leader's path relative to the lane markings.

The relative weight to be associated with lane markings (as determined by lane perception logic 124) and the leader path (as determined by leader perception logic 122) as used by the fused controller 145 can be changed over time as conditions change. For example, if the leader is taking an imminent exit ramp, the fused controller 145 can upweight the leader path (and the right lane marking) relative to the left lane marking and the left marking will eventually disappear. Conversely if the leader is not taking an imminent exit ramp, the fused controller 145 can downweight the rightmost lane marking relative to the leader path because that marking will eventually veer off the highway. Similar comments apply to places where lanes split and merge or to any situation where the correct motion is one where the leader is deliberately not following the otherwise relevant lane markings.

The Lane Following Controller 144 may therefore utilize any technique to develop the Lane Relative Pose (LRP) fed to the controller(s) 140. One specific method is to have the follower follow the leader's path while also using available lane perception inputs to observe lane constraints.

3.2 Leader Path Detection with Lane Following

Figure 5C:
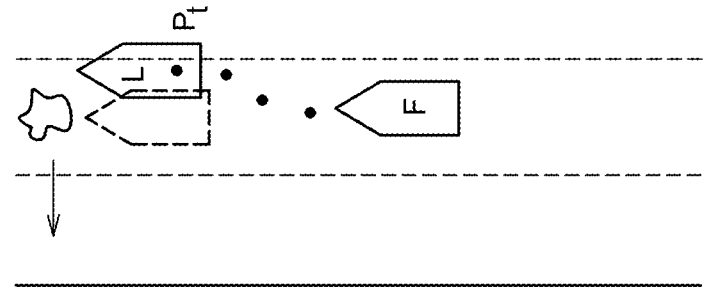
FIGS. 5A to 5C illustrate various states of lane following along a straight path.
Figure 5B:
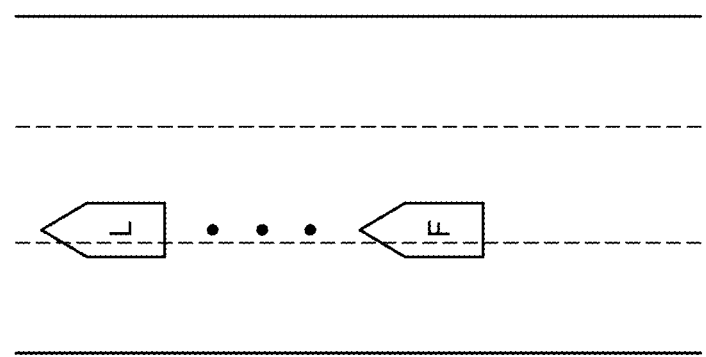
Figure 5A:
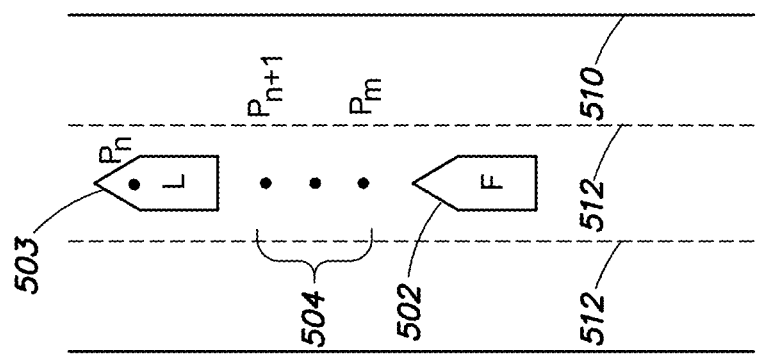

In one example shown in FIG. 5A, a follower (F) 502 detects or obtains information regarding a path 504 that the leader (L) 503 has followed along the ground (either by receiving it directly from the leader or by deriving it locally using its own sensors). The follower (F) strives to remain on that path while remaining in the same lane. The path may be defined by a series of positions Pn, Pn+1, . . . , Pm or in other ways.

These positions are then used to control the follower 502, such as to derive a desired longitudinal spacing from the leader 503. However, the Lane Following Controller 144 implements lateral control of the follower 502, that is, control of its relative location transverse to the road 510 (e.g., its position relative to the lanes), constrained instead by the lane markings 512. It should thus be understood that lateral control within a lane is not the same as controlling the spacing or gap between the leader 503 and follower 502 (for example, what an automatic cruise control might do, often referred to as longitudinal control). Vehicle convoys often impose a gap constraint, or a minimum distance between leader and follower. Here the gap constraint may be defined appropriately during turns to permit the follower to remain in the same lane that the leader had traversed, but at a shorter line-of-sight distance from the leader, at least temporarily. This can make it easier for the follower 502 to observe the lane discipline, such as by eliminating the tendency, using line-of-sight distance, for the follower 503 to speed up and close the gap to the leader 502 while negotiating the curve.

As with the leader perception logic 122, the leader's path 504 may be determined in several ways. The path that the leader is following may be a set of GPS coordinates transmitted by the leader to the follower over a V2V or other wireless interface. However, the leader's path 504 can also be determined by the follower 502 without input from the leader 503, such as by using cameras and image processing to periodically determine the leader's position. Based on such information, the follower 502 may be interested to determine any combination of the position of the leader 503 relative to itself in a) lateral or b) longitudinal directions, or c) the lateral position of the leader 503 with respect to the lane markings 512 near the leader's 503 wheels.

The follower 502 is thus interested to determine and use its own position with respect to the lane markings 512 near its own wheels. Such position can be detected by vision sensors located anywhere on the follower 502 that can see the lane markings 512 on the road ahead, behind, or to the side of the follower 502. Lane markings 512 may consist of painted solid or dashed lines on the road surface or any other physical or otherwise detectable feature that permits a measurement of lateral position on the road surface. Such features may include the edge of the pavement, jersey barriers, traffic cones, guardrails etc. When the need is extreme, such as when the road is covered with snow, lateral position can also be derived from the vehicles in adjacent lanes, either to avoid collision or to simply assume that their motion amounts to a partial definition of their lane. Another extreme example is deriving lateral position from tire tracks in the snow before the road has been cleared by a snowplow.

In general, the follower 502 remains in the same lane as the leader 503, observing the same lane discipline as the leader at all times. Nonetheless, there are several options for defining what the same lane discipline means, discussed below. While the follower 502 never operates without a leader 503 positioned substantially in front of it at all times, there are cases where both vehicles operate between lanes. Some cases are where there is a deliberate intent to change lanes, or to enter or leave entrance or exit ramps, or pull to the shoulder, or to avoid a collision. These will be discussed in connection with FIGS. 5B and 5C later on.

It should be understood that the lane following controller 144 does not attempt to merely "drive towards the leader on the shortest path", but instead may execute any of several lateral control disciplines, and they may even be combined in various ways. In so-called path mimicry, used in some conditions, the follower 502 may however follow the very same path that the leader 503 has traveled. Thus, in a "path mimicry" state, the follower also strives to arrive at the same positions Pn, Pn+1, ..., Pm 504 behind the leader.

The leader 503 may be driven by a human or, in other instances, can be a fully autonomous vehicle executing robust self driving algorithms (e.g., SAE Level 4 or 5 autonomy). There may be economic value in having the leader be human-driven, and there is potential safety and functional value in having most or all of the electronics on the follower duplicated on the leader. In one scenario, the leader 503 includes a full autonomy suite of sensors and reports what it is perceiving to the follower autonomy system.

Whichever is in control of the leader 503, be it a human or a robust autonomous driver, the leader 503 is always "proving" the path for the follower 502. Thus the lane following controller 144 can guarantee that the follower 502 will be operating in at least as safe a manner as the leader 503. This in turn reduces constraints on the follower 502, therefore permitting the autonomous follower 502 to have less complex logic, but still obtain increased safety benefits from following the leader.

Figure 6A:
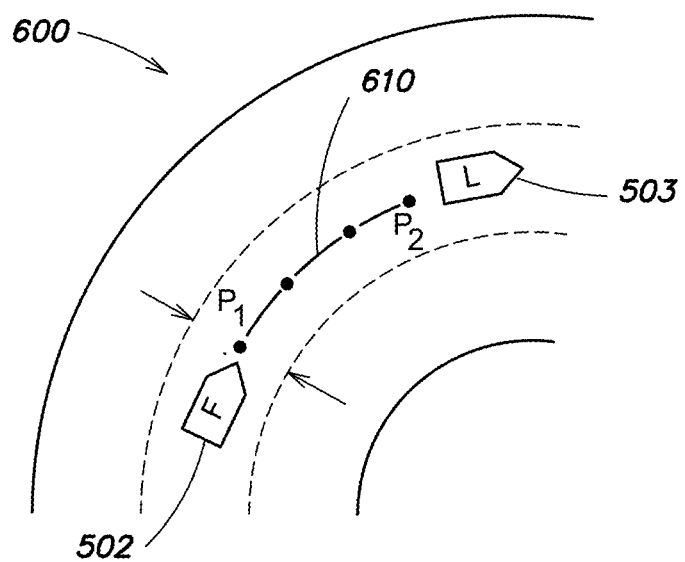
FIGS. 6A and 6B illustrate various states of lane following along a curved path.
Figure 6B:
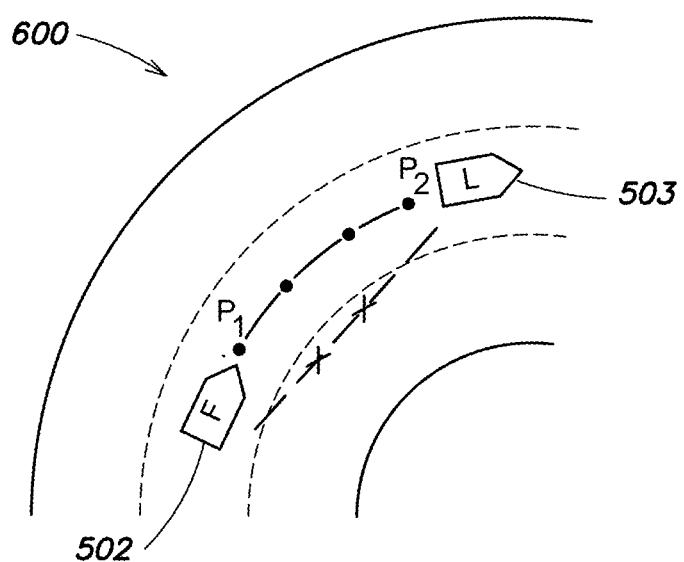

This is further understood with reference to a situation 600 such as shown in FIG. 6A. Here the leader 503 and follower 502 are traversing a path 610 that includes a curve. If the follower at position P1 were to simply "drive towards" the leader 503 at position P2, the follower might be apt to cross from the center lane into the right lane (as it approaches the apex of the curve) as shown in FIG. 6B. This situation is avoided by having the follower 502 both "follow the leader's path" and also "observe lane discipline" at the same time.

3.3 Lane Detection and Lane Following

There are many places, such as in narrow road construction zones, weigh stations, or parking areas where the road surface lacks adequate lane markings disposed on the road surface itself or features such as jersey barriers, or traffic cones. There are also situations such as when markings are missing, worn or destroyed or when airborne or surface obscurants (weather/debris) are present where either the road surface lacks adequate lane markings or they are otherwise not adequately visible. In such cases, path mimicry is a useful lateral control discipline because it does not depend on the existence of any detectable road features of any kind—the path of the leader forms the reference from which the path of the follower is derived.

Most of the time, however, a lane following discipline may be more useful. In this discipline, the follower is granted a degree of autonomy to decide or control its lane center offset, even if it differs from that of the leader.

One motivation for such autonomy is the fact that human drivers tend to allow their vehicle to drift sideways somewhat in their lanes due to insufficient attention levels, whether caused by fatigue or distraction, or for other reasons. Furthermore, numerous momentary disturbances such as wind, lateral acceleration, slippery surfaces etc. may cause the leader to deviate from its lane center. In such cases, there is risk and usually no value in requiring the follower to mimic the precise lane center offset of the leader. One risk is the slight risk that an area that is clear for the leader may no longer be clear when the follower arrives at the same place. Another risk is the tendency for lane center offset errors to compound (string instability) when numerous followers follow each other.

All of these risks are mitigated if the follower is granted "in-lane deviation authority"—the authority to move anywhere in its lane or, equivalently to deviate from the precise path of the leader, at least during routine operation, to some degree.

3.4 Lane Offset Mimicry and Temporary Deviations from the Path of the Leader

Nonetheless there are non-routine situations where it can be important for the follower to more closely follow the path of the leader. One case, that of inadequate lane markings, was discussed above. Another case is the case when there are lane markings but the leader is deliberately, and perhaps significantly, deviating from its lane center for a reason that suggests that the follower should do the same maneuver at the same place. As mentioned briefly above, when there are detectable lane markings, we can define the desired lateral control discipline as "lane center offset mimicry". Such a discipline may allow the desired follower path to be defined more accurately, and usefully, in terms of mimicking the leader's lane center offset. Such definition is distinct from path mimicry which, rather, defines the follower path in terms of an estimate of the leader's path (derived from vision sensor measurements of relative pose and the follower's motion history).

Returning attention to FIG. 5B, the logic implemented by lane following controller 144 (staying in the same lane as the leader) may also involve having the follower 502 exactly mimic the lane center offset of the leader 503. Here the leader 503 has drifted approximately by one-quarter lane into the left lane. The follower 502 may therefore adjust its lateral position to also travel to the left of center by one-quarter of a lane's width.

Motivations for using lane offset mimicry may include the potentially higher accuracy mentioned above as well as the fact that the follower's view of the road ahead is somewhat blocked by the leader itself. However, that is not to say that the follower might not deviate from the leader's path for short intervals of time or distance.

It is clear that the decision of whether to mimic the leader's 503 lane offset is a difficult one. It is clearly worthwhile when the leader 503 is avoiding a stationary obstacle, and clearly not worthwhile when mimicking the leader 503 will cause the follower 502 to collide with a vehicle adjacent to itself. Here again we can see that it can be advantageous for the follower to be granted a certain degree of autonomy. In realizing such autonomy, two design questions are 1) how does the follower know if the leader is deviating deliberately or not (being blown or the driver is inattentive) and 2) even if it is known, should the follower mimic or not. The follower might, for example, have deviation authority that permits rejecting a momentary swerve maneuver of the leader ("maneuver reject" authority), or generating and executing its own maneuver to avoid an obstacle ("obstacle avoidance" authority).

The term obstacle is used here as it is often used in the art. An obstacle refers, not only to rigid objects, stationary or moving, that may impede motion. An obstacle additionally refers to any other hazardous condition (often called a hazard), occurring or potentially occurring at a position in space at a certain time which may represent a safety risk to the vehicle or to the people, or property nearby. For example, a leader or follower vehicle may take action to avoid encountering an "obstacle" which is a spot on the roadway which is a pothole, or is covered in debris or snow, or is suspected of being black ice, or is poorly understood by perception of humans or machines.

As shown in FIG. 5C, in one situation the follower 502 may stay in the center lane even when the leader 503 reports (or is observed) to deviate temporarily. This might occur when an animal is detected running across the expected path of the leader (e.g., from right to left). This situation can also be detected for example by the follower with its cameras or other vision sensors.

If detected by the leader 503, the leader 503 can report the temporary deviation caused by the presence of the animal to the follower 502. Or perhaps the leader simply does not report its temporary position, Pt, in such a situation. The follower 502 can then determine it is safe to remain in its lane without deviation, because the animal will have passed by the time the follower 502 reaches that point. Or perhaps the follower 502 has maneuver reject authority and can determine that it is safest to continue to mimic the lane center offset of the leader 503, or to execute some other obstacle avoidance maneuver.

4. Fused Controller 145

As already mentioned, there are situations where it can be valuable to activate more than one lateral control discipline and to use fused controller 145 to choose from them in some manner. For example, in a case where a follower is mimicking the path of the leader in a construction zone, but there are jersey barriers or guardrails near the effective lane edges, it can be safer to allow the nominal path indicated by lane (e.g. guard rail) following to override the nominal path indicated by path mimicry because the latter brings the follower too close to the physical barrier at the edge of the lane. In other words, the leader path can be considered the preferred path but it can be overridden by choosing a lane derived path when safety requires it.

In other instances, the lane derived path can be considered the preferred path, such as when travelling on a long stretch of highway with clear visibility of the travel lane, but can be overridden by a leader derived path, such as when entering a construction zone, or an area where the lane markings are not visible.

Although FIG. 1 shows the fused controller 145 selecting from two options (lane following or leader following), it should be understood that further nuances to these are possible. For example the fused controller may be continuously comparing the leader derived path against a path determined by lane offset mimicry, and when the two paths disagree by more than some amount (such as a few inches), force control to the leader derived path.

Or in other scenarios, the lane derived path may be the preferable "normal" operation mode. When features that define the lane cannot be detected (such as when lane markings are not present, or weather or debris obscures the lane markings), leader path following may be utilized until such markings become visible again.

There are other ways to achieve the same result that may be more or less reliable. For example, if the follower has obstacle avoidance deviation authority, it can exercise such authority and treat jersey barrier lane edges as (hard) obstacles instead of lane markings (suggestions).

It is also likely to be most reliable for the follower to simply decide to switch to a lane following lateral control discipline in this case, as discussed above. If such autonomous switching is permitted, its practical implementation may require mechanisms for humans to intervene and mechanisms to impose preconditions on the switch.

The lane perception logic 124 may therefore derive the Lane Relative Pose using the above described methods, a combination thereof, or any of the other methods described in the other patent application referenced above.

5. Implementation Details and Options

As is now understood by one of skill in the art, one example embodiment involves the operation and configuration of certain components of an autonomous vehicle, such as a semi-truck. The semi-truck can include a tractor and an associated trailer. Per the example of FIG. 7, an electronics system 700 located in the tractor and/or trailer include one or more sensors 110, communications interfaces 115, perception logic 120, controllers 140, and interfaces 180 to drive system actuators 190.

The sensors 110 can include vision sensors such as cameras, radars, sonars, or LIDARs, speed sensors such as odometers and gyroscopes, and other sensors. Some vision sensors will have fields of view that encompass a region in front of the autonomous truck, and other vision sensors may have fields of view that encompass side regions extending laterally from each side of the tractor or of a trailer coupled to the tractor. Still other sensors may point downward to view lane markings or other indications of the lateral extent of a road surface and/or the region that constitutes the intended lane of travel.

Other electronics in the autonomous follower may include controllers such as one or more computers. The computer(s) process data received from the sensors, implement or use perception logic to determine one or more conditions, and implement or execute planner logic depending on those conditions. The planner logic in turn generates control signals that are fed to the controller logic. The controller logic in turn generates control signals that are fed to interfaces that operate the drive system.

Radio transceivers that transmit and receive data via wireless interfaces, such as a vehicle-to-vehicle (V2V) communication interface, may also provide data used in the planner or control logic.

For example, a desired path that the leader is following may be transmitted by the leader to the follower over the V2V interface.

The drive system includes at least acceleration (or throttle), braking, and steering mechanisms that respond to electrical control signal inputs provided by the control logic.

As used herein, the computers can include a programmable data processing device corresponding to one or more microprocessors, central processing units, graphics processing units, digital signal processors (DSPs), application-specific integrated circuits (ASICs), field-programmable gate arrays (FPGAs)), and/or custom designed hardware. In some configurations, methods performed by the computer(s) and/or the apparatus provided by the computers are instantiated via execution of software program code, e.g., execution of computer-readable instructions. These instructions can be stored in one or more memory resources of the computing device. The program code can include a program, a subroutine, a portion of a program, a software component and/or a specialized hardware component capable of performing one or more stated tasks or functions. A module or component can exist in memory or on a hardware component independently of other modules or components. Alternatively, a module or component can be a shared element or process of other modules, programs or machines.

The planner 127 receives data from the sensors 110, the perception logic 120, and/or the V2V interface 115 to determine actions which are to be performed by the autonomous follower, such as how to continue on a selected trajectory.

In some examples, sensor logic (not shown) can fuse the sensor data output by multiple sensors before such data is provided to the perception logic 120.

The perception logic 120 receives inputs from the sensors 110 and performs functions such as object detection and classification, or leader path determination 128, and/or leader path extrapolation or interpolation. Object detection and classification may use image processing to detect lane markings. The leader's path may be transmitted from the leader to the follower, or determined by the perception logic 120, such as by comparing successive images of the rear of a leader vehicle and using 3D image processing techniques to derive a sequence of poses of the leader.

The perception logic 120 can be specific in terms of identifying, for example, any one or more of a driving lane that the autonomous follower is using, its distance from an edge of a lane or edge of the road, and/or a distance of travel from a point of reference provided by the leader.

The perception output can be processed by the planner 127 and/or controller 140 such as to generate an alert, in some conditions, that causes the trajectory being followed to be altered. Such a condition may include avoiding an obstacle.

Interfaces enable control of the individual mechanical elements of the drive system. These can include interfaces to electrically (or through programming) control a propulsion component (e.g., a gas pedal or electric motor torque control, a steering interface for a steering mechanism, a braking interface for braking subsystem, etc. The commands can include trajectory inputs (e.g., steer, propel, brake) and one or more other ways to specify an operational state of the autonomous truck (e.g., desired speed and pose, acceleration, etc.).

The control logic 140 may additionally receive inputs from motion sensors 120 (e.g. odometer or speedometer for measuring distance and speed or gyroscope for measuring turn rate). It may perform functions such as feedback control that monitor the difference between desired and measured motions and adjust the control signals fed to the drive system in order to remove any errors.

By way of example, the commands generated from the controller(s) can specify a relative or absolute position along a road segment at which the autonomous follower is to occupy at a certain time and while in motion (e.g., its lateral position with respect to the current lane, or the longitudinal gap from the leader). The commands can specify a speed, a change in acceleration (or deceleration) from braking or accelerating, a turning action, etc. The controllers translate the commands into control signals for a corresponding mechanical interface; control signals can take the form of analog or digital electrical signals which correlate to the magnitude, duration, frequency or pulse, or other electrical characteristics.

6. Advantages

A number of advantages of the methods and apparatus described above should now be evident. They can be used as a basis of navigation when there are no (or poor) lane markings (on or off the highway). They can also be used with lane markings when there is reason to do so—e.g. during lane change maneuvers or obstacle avoidance. They can also be used for operating in construction zones, rest areas, toll booths etc. where lane markings may exist or may not be easily perceived. They can form the basis of error recovery routines.

It is not necessary to communicate anything from the leader to the follower to enable this approach. Equivalently, using only sensing, computing, and software on the follower, it can instead form an understanding of the path the leader has followed a) over time b) expressed relative to the follower at any instant of time.

Decoupling the path recovery trajectory from the present position of the leader avoids the need to drive toward the leader. The follower can instead drive toward the leader's path instead.

Forming an understanding of path following error can be used in a controller of any type to cause the follower to tend to recover the desired path.

They also provide the capacity to impose and differently weigh additional constraints or objectives on the motion of the follower such as following lanes, changing lanes, avoiding obstacles.

The follower can also now choose to deviate deliberately from the path of the leader so that the convoy can operate in tandem or in a parallel or any other configuration.

They also provide a capacity to start or stop motion so that the convoy can stop in lane when there is an error, pull to the side of the road when there is an error, pause at a toll booth or weigh station, follow an exit ramp and park in a rest area and then resume without waking up the follower driver.

7. Other Observations

The above description contains several example embodiments. It should be understood that while a particular feature may have been disclosed above with respect to only one of several embodiments, that particular feature may be combined with one or more other features of the other embodiments as may be desired and advantageous for any given or particular application. It is, of course, not possible to describe every conceivable combination of components or methodologies for purposes of describing the innovations herein, and one skilled in the art may now, in light of the above description, recognize that many further combinations and permutations are possible. Also, to the extent that the terms "includes," and "including" and variants thereof are used in either the detailed description or the claims, these terms are intended to be inclusive in a manner similar to the term "comprising".

It also should be understood that the block and flow diagrams may include more or fewer elements, be arranged differently, or be represented differently. The computing devices, processors, controllers, firmware, software, routines, or instructions as described herein may also perform only certain selected actions and/or functions. Therefore, it will be appreciated that any such descriptions that designate one or more such components as providing only certain functions are merely for convenience.

While a series of steps has been described above with respect to the flow diagrams, the order of the steps may be modified in other implementations. In addition, the operations and steps may be performed by additional or other modules or entities, which may be combined or separated to form other modules or entities. For example, while a series of steps has been described with regard to certain figures, the order of the steps may be modified in other implementations consistent with the principles explained herein. Further, non-dependent steps may be performed in parallel. Further, disclosed implementations may not be limited to any specific combination of hardware.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Accordingly, the subject matter covered by this patent is intended to embrace all such alterations, modifications, equivalents, and variations that fall within the spirit and scope of the claims that follow.

8. References

Coulter, R. Implementation of the Pure Pursuit Path Tracking Algorithm. Carnegie Mellon University, Pittsburgh, Pennsylvania, January 1990.
https://www.mathworks.com/help/robotics/ug/pure-pursuit-controller.html
Kelly, A, Mobile Robotics: Mathematics, Models, and Methods. Cambridge University Press, 2014, Chapter 8.3 pp. 551-565.
https://en.wikipedia.org/wiki/Kanade-Lucas-Tomasi_feature_tracker
H. Stevens, S. C. Tignor, and J. F. LoJacono. Off-tracking Calculations for Trailer Combinations. Public Roads, Vol. 34r No. 4, October 1966.

The invention claimed is:

1. A system for operating a plurality of vehicles in a platoon, the vehicles including a leader vehicle and a follower vehicle, the system comprising one or more processors, memory, and one or more programs stored in the memory for execution by the one or more processors, the one or more programs including instructions that when executed by the one or more processors cause the system to:
at the follower,
detect longitudinal positions of the leader along a path via sensor-based positional tracking, and without communication to the leader or by the leader of the positions;
operate one or more vehicle control inputs to cause the follower to arrive at the same longitudinal positions along the path;
control a lateral position of the follower along the path by determining a reference point on the leader vehicle, such that when the follower reaches each longitudinal position, a corresponding reference point on the follower also ends up in the same lateral position as a corresponding reference point of the leader at a time when the leader was located at that longitudinal position;
detect, one or more road features, wherein the one or more road features comprise any of a lane marking, a barrier, and a pavement edge along the path;
determine a Lane Relative Pose (LRP) based on a road feature of the one or more road features, wherein the lane relative pose comprises a position and orientation of the follower relative to the road feature;
determine a Leader-Follower Relative Pose (LFRP) based on sensor data from one or more sensors, wherein the leader follower relative pose comprises a position and orientation of the leader relative to the follower; and
selectively determine a recovery trajectory from either the LFRP, or the LRP, or a combination of both the LFRP and the LRP, depending on a condition, wherein to selectively determine a recovery trajectory, the one or more processors cause the system to:
detect a present pose of the leader; and
derive a pursuit pose along a desired path by interpolating backward from the present pose of the leader.

2. The system of claim 1 wherein the reference point is derived from a model of vehicle geometry for the leader vehicle.

3. The system of claim 1 wherein prior to selectively determining the recovery trajectory, the one or more programs including instructions that when executed by the one or more processors cause the system to:
detect the follower is not presently on the path.

4. The system of claim 3 wherein to selectively determine a recovery trajectory, the one or more processors further cause the system to:
derive a pursuit pose along a desired path by extrapolating from the present pose of the leader, by projecting forward.

5. The system of claim 4 wherein the pursuit pose is a distance that is independent of a distance derived solely from the Leader-Follower Relative pose.

6. The system of claim 5 wherein the lateral position is controlled independently of a desired longitudinal spacing between vehicles.

7. The system of claim 1 wherein the reference point depends on a door to camera relative pose.

8. The system of claim 1 wherein the reference point is a location on the leader vehicle other than rear doors or other visible components of the leader.

9. The system of claim 1 wherein the reference point is derived from a model of image formation of the leader vehicle.

10. The system of claim 1 wherein the condition is that one or more of lane markings, barriers and/or pavement cannot be detected sufficiently reliably, and the one or more processors cause the system to:
determine the recovery trajectory from only the LFRP and not the LRP.

11. The system of claim 1 wherein the condition is that one or more of lane markings, barriers and/or pavement are able to be detected, and the one or more processors cause the system to:
determine the recovery trajectory from only the LRP and not the LFRP.

12. The system of claim 1 wherein the condition is starting or stopping from a tandem configuration, a parallel configuration, or a combination of both the tandem configuration and the parallel configuration.

13. The system of claim 1 wherein the condition is stopping in parallel, and the one or more processors further cause the system to, at the follower:
determine an offset path that is offset laterally or longitudinally or both from at least one position of the path followed by the leader.

14. The system of claim 1 wherein the road feature is a lane that is other than the lane currently occupied by the follower.

15. A system for operating a plurality of vehicles in a platoon, the vehicles including a leader vehicle and a follower vehicle, the system comprising one or more processors, memory, and one or more programs stored in the memory for execution by the one or more processors, the one or more programs including instructions that when executed by the one or more processors cause the system to:

at the follower,
- determine positions of the leader along a path;
- determine a travel lane of the follower by using one or more sensors to detect one or more of lane markings, barriers, pavement edge or other attributes of a travel lane; and
- selectively control the position of the follower by either following the travel lane or by following the leader, wherein, to selectively control the position of the follower, the one or more programs including instructions that when executed by the one or more processors further cause the system to:
  - determine a lane center offset of the leader based on sensor data from one or more of the sensors, and mimic the determined land center offset of the vehicle; and
  - when a lane center offset of the follower cannot be determined, then control the lane center offset position of the by following mimicking the path of the leader to arrive at a plurality of positions along a path traveled by the leader.

16. The system of claim 15 wherein while the travel lane cannot be detected using the sensors, then one or more programs including instructions that when executed by the one or more processors cause the system to control the position of the follower by following the leader.

17. The system of claim 15 wherein the step of selectively controlling the position of the follower further comprises:
- in a first state, controlling the position of the follower from the travel lane;
- in a second state, controlling the position of the follower from the position of the leader; and
- in a third state, controlling the position of the follower from the travel lane.

18. A method of operating a plurality of vehicles in a platoon, the vehicles including a leader vehicle and a follower vehicle, the method comprising:
at the follower,
- detecting longitudinal positions of the leader along a path via sensor-based positional tracking using one or more sensors on the follower vehicle, and without communication to the leader or by the leader of the positions;
- operating one or more vehicle control inputs to cause the follower to arrive at the same longitudinal positions along the path; and
- controlling a lateral position of the follower along the path by determining a reference point on the leader vehicle, wherein the reference point on the leader vehicle is derived from a model of vehicle geometry for the leader vehicle, and wherein the reference point comprises an aspect of a vehicle geometry of the leader vehicle not detectable by the one or more sensors on the follower vehicle, such that when the follower reaches each longitudinal position, a corresponding reference point on the follower also ends up in the same lateral position as a corresponding reference point of the leader at a time when the leader was located at that longitudinal position.

* * * * *